United States Patent
Sasaki

(10) Patent No.: US 12,401,057 B2
(45) Date of Patent: Aug. 26, 2025

(54) EXTERIOR MATERIAL FOR ALL-SOLID-STATE BATTERY, METHOD FOR MANUFACTURING SAME, AND ALL-SOLID-STATE BATTERY

(71) Applicant: DAI NIPPON PRINTING CO., LTD., Tokyo (JP)

(72) Inventor: Miho Sasaki, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 1039 days.

(21) Appl. No.: 17/424,535

(22) PCT Filed: Jan. 23, 2020

(86) PCT No.: PCT/JP2020/002426
§ 371 (c)(1),
(2) Date: Jul. 21, 2021

(87) PCT Pub. No.: WO2020/153458
PCT Pub. Date: Jul. 30, 2020

(65) Prior Publication Data
US 2022/0069344 A1    Mar. 3, 2022

(30) Foreign Application Priority Data
Jan. 23, 2019 (JP) .................... 2019-009812

(51) Int. Cl.
*H01M 10/0562* (2010.01)
*H01M 50/129* (2021.01)
*H01M 50/105* (2021.01)

(52) U.S. Cl.
CPC ..... *H01M 10/0562* (2013.01); *H01M 50/129* (2021.01); *H01M 50/105* (2021.01)

(58) Field of Classification Search
CPC .......... H01M 10/0562; H01M 50/129; H01M 50/105; H01M 10/052; H01M 2300/0068;
(Continued)

(56) References Cited

U.S. PATENT DOCUMENTS 9,786,946 B2 * 10/2017 Sasaoka ............. H01M 10/482
2009/0186270 A1    7/2009 Harada et al.
(Continued)

FOREIGN PATENT DOCUMENTS

CN    104412440 A    3/2015
CN    107431150 A    12/2017
(Continued)

OTHER PUBLICATIONS

Dec. 21, 2023 Office Action issued in Chinese Patent Application No. 202080010363.7.
(Continued)

*Primary Examiner* — Abdullah A Riyami
*Assistant Examiner* — Nader J Alhawamdeh
(74) *Attorney, Agent, or Firm* — Oliff PLC

(57) ABSTRACT

An exterior material for an all-solid-state battery, wherein hydrogen sulfide generated inside the all-solid-state battery including a sulfide solid electrolyte material is effectively suppressed from leaking to the outside. The exterior material for an all-solid-state battery is used for an all-solid-state battery including a sulfide solid electrolyte material, and is composed of a laminate having: at least a substrate layer; a barrier layer; and a heat-fusible resin layer in this order from the outside, wherein the amount of hydrogen sulfide permeation through the resin constituting the heat-fusible resin layer is $1.0\times10^{-9}$ cc·mm/cm²·sec·cmHg or less.

18 Claims, 3 Drawing Sheets

(58) Field of Classification Search
CPC ...... H01M 50/131; Y02E 60/10; Y02P 70/50; B32B 15/088; B32B 15/09
See application file for complete search history.

(56) References Cited

U.S. PATENT DOCUMENTS

| | | | |
|---|---|---|---|
| 2012/0216394 A1* | 8/2012 | Kitaura | H01M 10/052 |
| | | | 29/623.2 |
| 2015/0147659 A1 | 5/2015 | Kato | |
| 2015/0270585 A1* | 9/2015 | Sasaoka | H01M 10/0468 |
| | | | 429/157 |
| 2018/0076423 A1 | 3/2018 | Kokuryo et al. | |
| 2019/0036086 A1 | 1/2019 | Ueda et al. | |
| 2022/0069344 A1* | 3/2022 | Sasaki | H01M 10/052 |
| 2023/0246267 A1* | 8/2023 | Okano | B32B 15/088 |
| | | | 429/163 |
| 2023/0261290 A1* | 8/2023 | Okano | H01M 50/126 |
| | | | 429/163 |
| 2024/0006691 A1* | 1/2024 | Sasaki | B32B 27/34 |

FOREIGN PATENT DOCUMENTS

| | | | | |
|---|---|---|---|---|
| EP | 2996170 A1 | | 3/2016 | |
| JP | 2003051291 A | * | 2/2003 | ............ H01M 2/021 |
| JP | 2008-103245 A | | 5/2008 | |
| JP | 2008-103288 A | | 5/2008 | |
| JP | 2011-124084 A | | 6/2011 | |
| JP | 2014049204 A | * | 3/2014 | |
| JP | 2015-179618 A | | 10/2015 | |
| JP | 2015-188874 A | | 11/2015 | |
| JP | 2016-058142 A | | 4/2016 | |
| WO | 2017-142071 A1 | | 8/2017 | |

OTHER PUBLICATIONS

Apr. 14, 2020 International Search Report issued in International Patent Application No. PCT/JP2020/002426.

Jul. 19, 2024 Extended European Searh Report issued in European Patent Appliction No. 20744916.6.

* cited by examiner

EXTERIOR MATERIAL FOR ALL-SOLID-STATE BATTERY, METHOD FOR MANUFACTURING SAME, AND ALL-SOLID-STATE BATTERY

TECHNICAL FIELD

The present disclosure relates to an exterior material for an all-solid-state battery, a method for manufacturing the exterior material, and an all-solid-state battery.

BACKGROUND ART

An all-solid-state battery having a solid electrolyte as an electrolyte is known. The all-solid-state battery has the advantages of high safety and a wide operating temperature range because an organic solvent is not used in the battery.

Among inorganic solid electrolytes, sulfide-based inorganic solid electrolytes are known to have high ionic conductivity. However, as described in, for example, Patent Document 1, the sulfide-based inorganic solid electrolyte contains a sulfur compound that may generate toxic hydrogen sulfide when reacting with water. Thus, if the all-solid-state battery is damaged, hydrogen sulfide gas may be generated by reacting with moisture in the air.

On the other hand, in recent years, batteries are required to be diversified in shape and to be thinned and lightened with improvement of performance of electric cars, hybrid electric cars, personal computers, cameras, mobile phones and so on. However, metallic battery exterior materials that have often been heretofore used for batteries have the disadvantage that it is difficult to keep up with diversification in shape, and there is a limit on weight reduction. Thus, there has been proposed a film-shaped exterior material with a base material layer, a barrier layer and a heat-sealable resin layer laminated in this order has been proposed as an exterior material which is easily processed into diversified shapes and is capable of achieving thickness reduction and weight reduction.

In such a film-shaped exterior material, generally, a space for housing battery elements is provided by molding into a bag shape or molding using a mold, and battery elements such as an electrode and a solid electrolyte are disposed in the space, and the heat-sealable resin layers are heat-sealed to each other to obtain a battery in which battery elements are housed inside the exterior material.

By applying such a film-shaped exterior material to an exterior material for an all-solid-state battery, weight reduction of electric vehicles, hybrid electric vehicles and the like are expected.

PRIOR ART DOCUMENT

Patent Document

Patent Document 1: Japanese Patent Laid-open Publication No. 2008-103288

SUMMARY OF THE INVENTION

Problems to be Solved by the Invention

Patent Document 1 proposes a technique in which in an all-solid-state battery including a sulfide-based inorganic solid electrolyte, an exterior material for the all-solid-state battery is further covered with an adsorbent and/or an alkaline substance-containing material for coping with generation of a hydrogen sulfide gas in case where the all-solid-state battery is damaged.

However, in the case where a film-shaped exterior material in which a base material, a barrier layer and a heat-sealable resin layer are laminated in this order is used, hydrogen sulfide may be generated inside the all-solid-state battery not only by damage to the all-solid-state battery but also by ingress of a very small amount of water vapor into the all-solid-state battery from a heat-sealed portion between heat-sealable resin layers. The inventors of the present disclosure have conducted studies, and resultantly found that hydrogen sulfide generated inside the all-solid-state battery may pass through the heat-sealable resin layer and leak to the outside.

Under these circumstances, a main object of the present disclosure is to provide an exterior material for an all-solid-state battery, wherein hydrogen sulfide generated inside the all-solid-state battery including a sulfide solid electrolyte material is effectively suppressed from leaking to the outside.

Means for Solving the Problem

The inventors of the present disclosure have extensively conducted studies for achieving the above-mentioned object. As a result, it has been found that when in an exterior material for an all-solid-state battery which includes a laminate including at least a base material layer, a barrier layer and a heat-sealable resin layer in this order from the outside and in which the hydrogen sulfide permeability of a resin forming the heat-sealable resin layer is not above a predetermined value, leakage of hydrogen sulfide generated inside the all-solid-state battery containing a sulfide solid electrolyte material to the outside is effectively suppressed.

The present disclosure has been completed by further conducting studies based on the above-mentioned findings. That is, the present disclosure provides an invention of an aspect as described below:

An exterior material for an all-solid-state battery is used for an all-solid-state battery including a sulfide solid electrolyte material, and includes a laminate including: at least a base material layer; a barrier layer; and a heat-sealable resin layer in this order from the outside. The amount of hydrogen sulfide permeation through the resin forming the heat-sealable resin layer is $1.0 \times 10^{-9}$ cc·mm/cm²·sec·cmHg or less.

Advantages of the Invention

According to the present disclosure, it is possible to provide an exterior material for an all-solid-state battery in which leakage of hydrogen sulfide generated inside the all-solid-state battery containing a sulfide solid electrolyte material to the outside is effectively suppressed. Further, according to the present disclosure, it is also possible to provide a method for manufacturing an exterior material for an all-solid-state battery, and an all-solid-state battery.

EMBODIMENTS OF THE INVENTION

Figure 1:
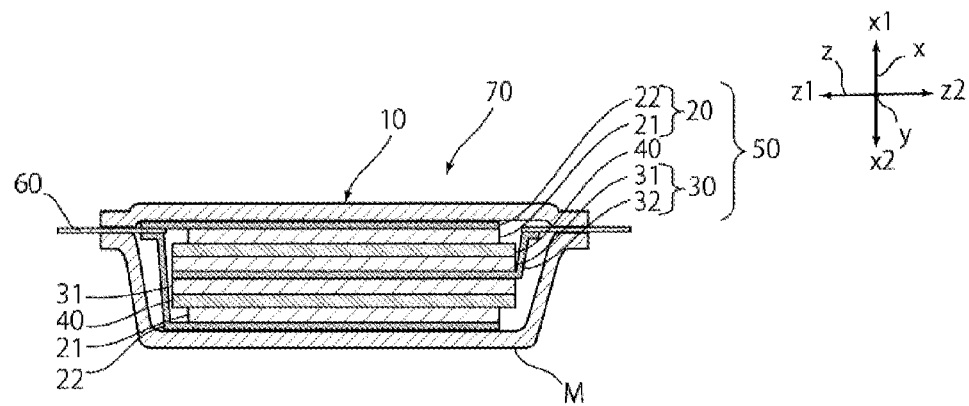
FIG. 1 is a schematic diagram showing an example of a cross-sectional structure of an all-solid-state battery to which an exterior material for an all-solid-state battery according to the present disclosure is applied.

The exterior material for an all-solid-state battery according to the present disclosure is an exterior material which is used for an all-solid-state battery containing a sulfide solid electrolyte material, and includes a laminate including at least a base material layer; a barrier layer; and a heat-sealable resin layer in this order from the outside, and the hydrogen sulfide permeability of the resin forming the heat-sealable resin layer is $1.0 \times 10^{-9}$ cc·mm/cm²·sec·cmHg or less. When the exterior material for an all-solid-state battery according to the present disclosure is applied as an exterior material for an all-solid-state battery containing a sulfide solid electrolyte material, leakage of hydrogen sulfide generated inside the all-solid-state battery to the outside is effectively suppressed because the exterior material for an all-solid-state battery has the above-mentioned configuration.

Hereinafter, the exterior material for an all-solid-state battery according to the present disclosure will be described in detail. In this specification, a numerical range indicated by the term "A to B" means "A or more" and "B or less". For example, the expression of "2 to 15 mm" means 2 mm or more and 15 mm or less.

1. Laminated Structure of Exterior Material for all-Solid-State Battery

As shown in, for example, FIGS. 4 to 9, an exterior material 10 for an all-solid-state battery according to the present disclosure includes a laminate including at least a base material layer 1, a barrier layer 3 and a heat-sealable resin layer 4 in this order from the outside. In the exterior material 10 for an all-solid-state battery, the heat-sealable resin layer 4 is an innermost layer. In construction of the all-solid-state battery using the exterior material 10 tor an all-solid-state battery and battery elements, the battery elements are put in a space formed by heat-sealing the peripheral portions of the heat-sealable resin layers 4 of the exterior material 10 for an all-solid-state battery which face each other. In an all-solid-state battery to which the exterior material 10 for an all-solid-state battery according to the present disclosure is applied, a heat-sealed peripheral edge portion of a space (concave portion) in which the battery element is housed is preferably flat except for a portion where a metal terminal is present. In the all-solid-state battery to which the exterior material 10 for an all-solid-state battery according to the present disclosure is applied, it is not necessary to dispose a substance for absorbing hydrogen sulfide (a hydrogen sulfide absorbing substance different from a resin forming the heat-sealable resin layer) on the peripheral edge portion of a space (concave portion) in which the battery element is housed.

Figure 6:
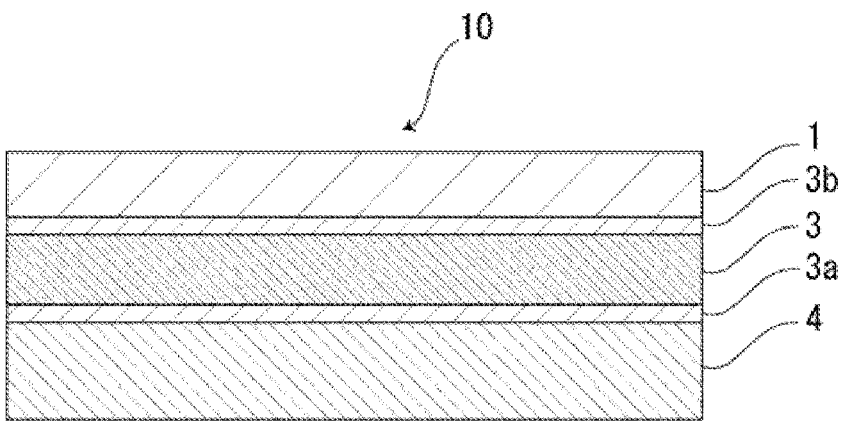
FIG. 6 is a schematic cross-sectional view showing an example of a laminated structure of the exterior material for an all-solid-state battery according to the present disclosure.
Figure 7:
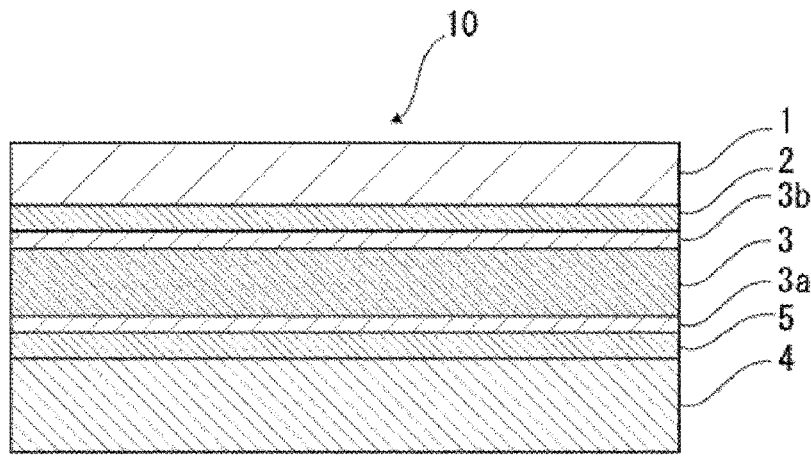
FIG. 7 is a schematic cross-sectional view showing an example of a laminated structure of the exterior material for an all-solid-state battery according to the present disclosure.
Figure 8:
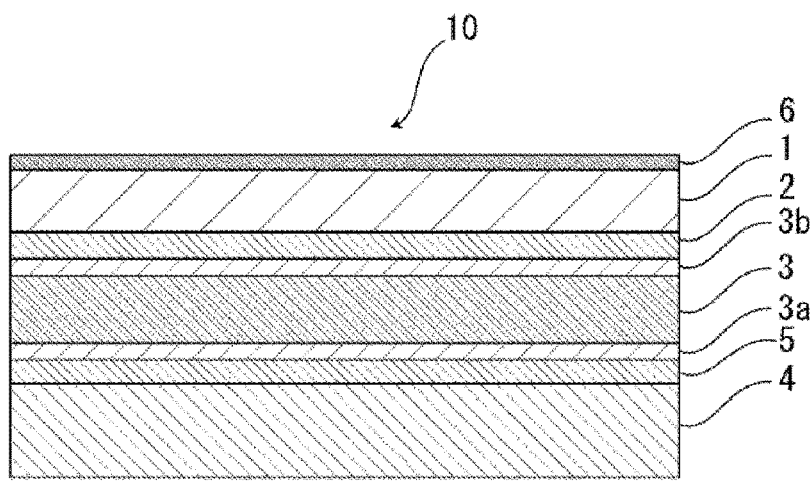
FIG. 8 is a schematic cross-sectional view showing an example of a laminated structure of the exterior material for an all-solid-state battery according to the present disclosure.

It is preferable that in the exterior material 10 for an all-solid-state battery, a barrier layer protective film 3a is provided on a surface of the barrier layer 3 on the heat-sealable resin layer 4 side as shown in the schematic diagrams of FIGS. 5 to 8. In addition, it is preferable that a barrier layer protective film 3b is provided on a surface of the barrier layer 3 on the base material layer 1 side. FIGS. 6 to 8 are schematic diagrams in which the exterior material 10 for an all-solid-state battery includes barrier layer protective films 3a and 3b on, respectively, both surfaces of the barrier layer 3. As described later, the exterior material 10 may include the barrier layer protective film 3a only on a surface of the barrier layer 3 on the heat-sealable resin layer 4 side, or may include the barrier layer protective films 3a and 3b, respectively, on both surfaces of the barrier layer 3.

As shown in, for example, FIGS. 7 and 8, the exterior material 10 for an all-solid-state battery may have an adhesive agent layer 2 between the base material layer 1 and the barrier layer 3 (between the base material layer 1 and the barrier layer protective film 3b when the barrier layer protective film 3b is present) if necessary for the purpose of, for example, improving bondability between these layers. As shown in, for example, FIGS. 7 and 8, an adhesive layer 5 may be present between the barrier layer 3 and the heat-sealable resin layer 4 (between the barrier layer protective film 3a and the heat-sealable resin layer 4 when the barrier layer protective film 3a is present) if necessary for the purpose of, for example, improving bondability between these layers. As shown in FIG. 8, a surface coating layer 6 or the like may be provided outside the base material layer 1 (on a side opposite to the heat-sealable resin layer 4 side). Details of each layer forming the exterior material 10 will be described in detail in the section "3. Layers forming exterior material".

The thickness of the laminate forming the exterior material 10 for an all-solid-state battery is not particularly limited, and is preferably about 10,000 μm or less, about 8,000 μm or less, or about 5,000 μm or less from the viewpoint of cost reduction, improvement of the energy density and the like, and preferably about 100 μm or more, about 150 μm or more, or about 200 μm or more from the viewpoint of maintaining the function of the exterior material 10 for an all-solid-state battery of protecting a battery element. The thickness of the laminate is preferably, in the range of, for example, about 100 to 10,000 μm, about 100 to 8,000 μm, about 100 to 5,000 μm, about 150 to 10,000 μm, about 150 to 8,000 μm, about 150 to 5,000 μm, about 200 to 10,000 μm, about 200 to 8,000 μm, or about 200 to 5,000 μm, and particularly preferably about 100 to 500 μm.

Details of each layer forming the exterior material 10 for an all-solid-state battery will be described in the section "3. Layers forming exterior material for all-solid-state battery".

2. All-Solid-State Battery

The all-solid-state battery to which the exterior material 10 for an all-solid-state battery (hereinafter, sometimes referred to as an "exterior material 10") according to the present disclosure is applied is not particularly limited as long as the solid electrolyte layer 40 contains a sulfide solid electrolyte material and a specific exterior material 10 is used. That is, the constituents other than the solid electrolyte layer 40 and the exterior material 10 (electrodes, terminals, and the like) are not particularly limited as long as they are applied to an all-solid-state battery, and may be those that are used in a known all-solid-state battery. Hereinafter, an aspect in which the exterior material 10 for an all-solid-state battery according to the present disclosure is applied to an all-solid-state battery will be specifically described by taking an all-solid-state battery 70 according to the present disclosure as an example.

Figure 2:
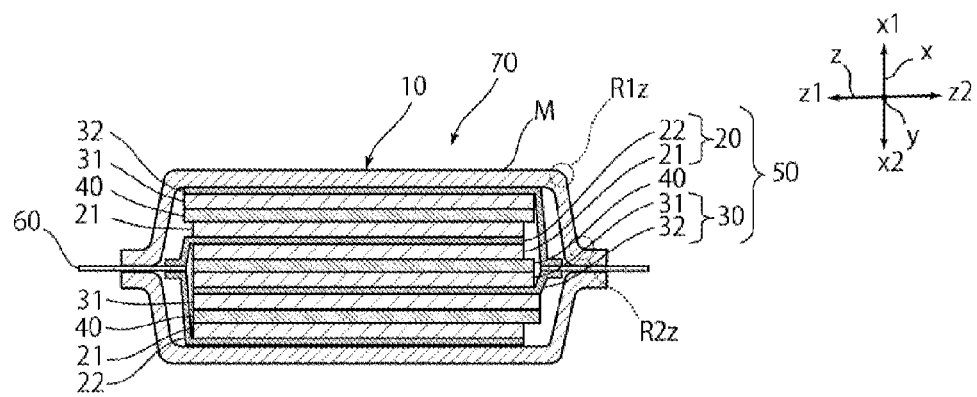
FIG. 2 is a schematic diagram showing an example of a cross-sectional structure of the all-solid-state battery to which an exterior material for an all-solid-state battery according to the present disclosure is applied.
Figure 3:
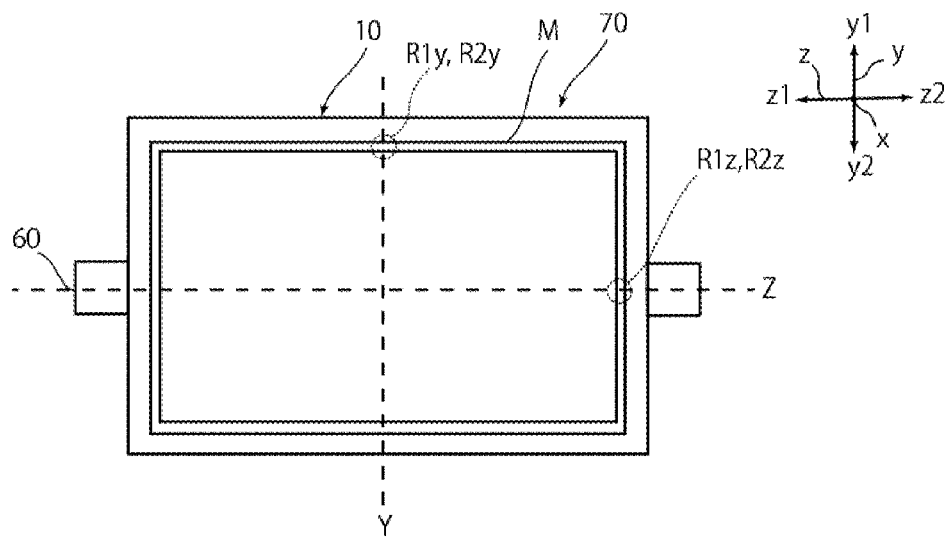
FIG. 3 is a schematic plan view of an example of an all-solid-state battery to which the exterior material for an all-solid-state battery according to the present disclosure is applied.
Figure 4:
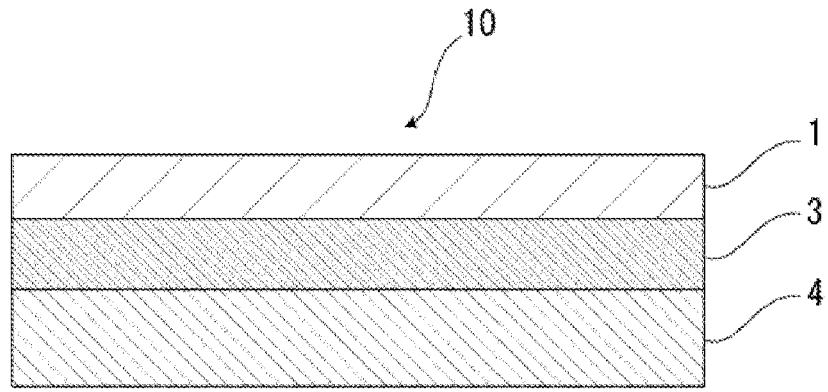
FIG. 4 is a schematic cross-sectional view showing an example of a laminated structure of the exterior material for an all-solid-state battery according to the present disclosure.
Figure 5:
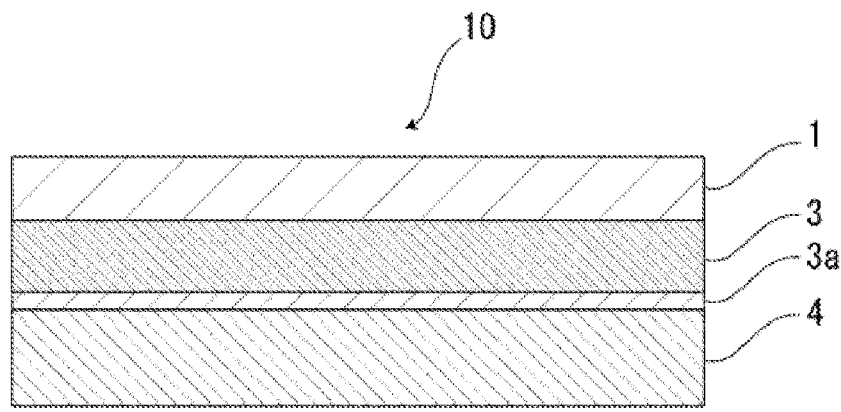
FIG. 5 is a schematic cross-sectional view showing an example of a laminated structure of the exterior material for an all-solid-state battery according to the present disclosure.

As shown in the schematic diagrams of FIGS. 1 to 3, the all-solid-state battery 70 according to the present disclosure is one in which a battery element including at least a unit cell 50 including a positive active material layer 31, a negative active material layer 21, and a solid electrolyte layer 40 laminated between the positive active material layer 31 and the negative active material layer 21 is housed in a packaging formed from the exterior material for an all-solid-state battery 10 according to the present disclosure. More specifically, the positive active material layer 31 is laminated on a positive electrode current collector 32 to form a positive electrode layer 30, and the negative active material layer 21 is laminated on a negative electrode current collector 22 to form a negative electrode layer 20. The positive electrode current collector 32 and the negative electrode current collector 22 are each bonded to the terminal 60 exposed to the outside and electrically connected to the external environment. The solid electrolyte layer 40 is laminated between the positive electrode layer 30 and the negative electrode layer 20, and the positive electrode layer 30, the negative electrode layer 20 and the solid electrolyte layer 40 form the unit cell 50. The battery element of the all-solid-state battery 70 may include only one unit cell 50 or may include a plurality of unit cells 50. FIG. 1 shows the all-solid-state battery 70 including two unit cells 50 as battery elements, and FIG. 2 shows the all-solid-state battery 70 in which three unit cells 50 are laminated to form a battery element.

In the all-solid-state battery 70, the battery element is covered such that a flange portion (region where heat-sealable resin layers 4 are in contact with each other) can be formed on the periphery of the battery element while the terminal 60 connected to each of the positive electrode layer 30 and the negative electrode layer 20 protrudes to the outside, and the heat-sealable resin layers 4 at the flange portion are heat-sealed to each other, thereby providing an all-solid-state battery including an exterior material for an all-solid-state battery. When a battery element is housed in a packaging formed from the exterior material 10 for an all-solid-state battery according to the present disclosure, the packaging is formed in such a manner that the heat-sealable resin portion of the exterior material 10 for an all-solid-state battery according to the present disclosure is on the inner side (a surface contacting the battery element). In the all-solid-state battery 70 according to the present disclosure, a heat-sealed peripheral edge portion of a space (concave portion) in which the battery element is housed is preferably flat except for a portion where a metal terminal is present as described above. In the all-solid-state battery 70 according to the present disclosure, it is not necessary to dispose a substance for absorbing hydrogen sulfide (a hydrogen sulfide absorbing substance different from a resin forming the heat-sealable resin layer) on the peripheral edge portion of a space (concave portion) in which the battery element is housed.

As described above, the all-solid-state battery to which the exterior material 10 according to the present disclosure is applied is not particularly limited as long as the solid electrolyte contains a sulfide solid electrolyte material and a specific exterior material 10 is used, and the same applies to the all-solid-state battery 70 according to the present disclosure. Hereinafter, materials of members forming the battery element of the all-solid-state battery to which the exterior material 10 according to the present disclosure is applied, etc. will be exemplified.

As described above, in the battery element of the all-solid-state battery 70, at least the positive electrode layer 30, the negative electrode layer 20 and the solid electrolyte layer 40 form the unit cell 50. The positive electrode layer 30 has a structure in which the positive active material layer 31 is laminated on the positive electrode current collector 32. The negative electrode layer 20 has a structure in which the negative active material layer 21 is laminated on the negative electrode current collector 22. The positive electrode current collector 32 and the negative electrode current collector 22 are each bonded to the terminal 60 exposed to the outside and electrically connected to the external environment.

[Positive Active Material Layer 31]

The positive active material layer 31 is a layer containing at least a positive active material. If necessary, the positive active material layer 31 may further contain a solid electrolyte material, a conductive material, a binding material and the like in addition to the positive active material.

The positive active material is not particularly limited, and examples thereof include oxide active materials and sulfide active materials. When the all-solid-state battery is an all-solid-state lithium battery, examples of the oxide active material used as the positive active material include rock salt layered active materials such as $LiCoO_2$, $LiMnO_2$, $LiNiO_2$, $LiVO_2$ and $LiNi_{1/3}Co_{1/3}Mn_{1/3}O_2$, spinel type active materials such as $LiMn_2O_4$ and $Li(Ni_{0.5}Mn_{1.5})O_4$, olivine type active materials such as $LiFePO_4$ and $LiMnPO_4$, and Si-containing active materials such as $Li_2FeSiO_4$ and $Li_2MnSiO_4$. In addition, examples of the sulfide active material used as the positive active material of the all-solid-state lithium battery include copper shredder, iron sulfide, cobalt sulfide and nickel sulfide.

The shape of the positive active material is not particularly limited, and examples thereof include a particle shape. Preferably, the mean particle size ($D_{50}$) of the positive active material is, for example, about 0.1 to 50 μm. The content of the positive active material in the positive active material layer 31 is preferably about 10 to 99 mass %, more preferably about 20 to 90 mass %.

Preferably, the positive active material layer 31 further contains a solid electrolyte material. This enables improvement of ion conductivity in the positive active material layer 31. The solid electrolyte material contained in the positive active material layer 31 is the same as the solid electrolyte material exemplified for the solid electrolyte layer 40 described later. The content of the solid electrolyte material in the positive active material layer is preferably about 1 to 90 mass %, more preferably about 10 to 80 mass %.

The positive active material layer 31 may further contain a conductive material. Addition of a conductive material enables improvement of the electron conductivity of the positive active material layer. Examples of the conductive material include acetylene black, Ketjen black and carbon fiber. The positive active material layer may further contain a binding material. Examples of the binding material include fluorine-containing binding materials such as polytetrafluoroethylene (PTFE) and polyvinylidene fluoride (PVDF).

The thickness of the positive active material layer 31 is appropriately set according to the size and the like of the all-solid-state battery, and is preferably about 0.1 to 1000 μm.

[Positive Electrode Current Collector 32]

Examples of the material forming the positive electrode current collector 32 include stainless steel (SUS), aluminum, nickel, iron, titanium and carbon.

The thickness of the positive electrode current collector 32 is appropriately set according to the size and the like of the all-solid-state battery, and is preferably about 10 to 1,000 μm.

[Negative Active Material Layer 21]

The negative active material layer 21 is a layer containing at least a negative active material. If necessary, the negative active material layer 21 may further contain a solid electrolyte material, a conductive material, a binding material and the like in addition to the negative active material.

The negative active material is not particularly limited, and examples thereof include carbon active materials, metal active materials and oxide active materials. Examples of the carbon active material include graphite such as mesocarbon microbeads (MCMB) and highly oriented graphite (HOPG), and amorphous carbon such as hard carbon and soft carbon. Examples of the metal active material include In, Al, Si, and Sn. Examples of the oxide active material include $Nb_2O_5$, $Li_4Ti_5O_{12}$ and SiO.

The shape of the negative active material is not particularly limited, and examples thereof include a particle shape and a film shape. The mean particle size ($D_{50}$) of the negative active material is preferably about 0.1 to 50 μm. The content of the negative active material in the negative active material layer 21 is, for example, about 10 to 99 mass %, more preferably about 20 to 90 mass %.

Preferably, the negative active material layer 21 further contains a solid electrolyte material. This enables improvement of ion conductivity in the negative active material layer 21. The solid electrolyte material contained in the negative active material layer 21 is the same as the solid electrolyte material exemplified for the solid electrolyte layer 40 described later. The content of the solid electrolyte material in the negative active material layer 21 is preferably about 1 to 90 mass %, more preferably about 10 to 80 mass %.

The negative active material layer 21 may further contain a conductive material. The negative active material layer 21 may further contain a binding material. The conductive material and the binding material are the same as those exemplified for the positive active material layer 31 described above.

The thickness of the negative active material layer 21 is appropriately set according to the size and the like of the all-solid-state battery, and is preferably about 0.1 to 1000 μm.

[Negative Electrode Current Collector 22]

Examples of the material forming the negative electrode current collector 22 include stainless steel (SUS), copper, nickel and carbon.

The thickness of the negative electrode current collector 22 is appropriately set according to the size and the like of the all-solid-state battery, and is preferably about 10 to 1,000 μm.

[Solid Electrolyte Layer 40]

The solid electrolyte layer 40 is a layer containing a sulfide solid electrolyte material.

Sulfide solid electrolyte materials are preferable because many of the sulfide solid electrolyte materials have higher ion conductivity over oxide solid electrolyte materials.

When the exterior material 10 for an all-solid-state battery according to the present disclosure is applied to an all-solid-state battery containing a sulfide solid electrolyte material, leakage of hydrogen sulfide generated inside the all-solid-state battery to the outside can be effectively suppressed.

Specific examples of the sulfide solid electrolyte material include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$ and $Li_2SP_2S_5$—ZmSn (where each of m and n is a positive number, and Z is any of Ge, Zn and Ga), $Li_2S$—$GeS_2$, $Li_2S$—$SiS_2$—$Li_3PO_4$ and $Li_2S$—$SiS_2$—$Li_xMO_y$, (where each of x and y is a positive number, and M is any of P, Si, Ge, B, Al, Ga, and In). Note that the above description of "$Li_2S$—$P_2S_5$" means a sulfide solid electrolyte material obtained using a raw material composition containing $Li_2S$ and $P_2S_5$, and the same applies to other descriptions. The sulfide solid electrolyte material may be sulfide glass or crystallized sulfide glass.

The content of the solid electrolyte material in the solid electrolyte layer 40 is not particularly limited, and is preferably 60 mass % or more, more preferably 70 mass % or more, still more preferably 80 mass % or more. The solid electrolyte layer may contain a binding material or may include only a solid electrolyte material.

The thickness of the solid electrolyte layer 40 is appropriately set according to the size and the like of the all-solid-state battery, and is preferably about 0.1 to 1,000 μm, more preferably about 0.1 to 300 μm.

The all-solid-state battery 70 according to the present disclosure can be suitably used in an environment of being constrained under high pressure from the outside. From the viewpoint of suitably suppressing delamination between the solid electrolyte and the negative active material layer (and between the solid electrolyte and the positive active material layer), the pressure for constraining the all-solid-state battery 70 from the outside is preferably about 0.1 MPa or more, more preferably 5 MPa or more, still more preferably about 1 MPa or more, and preferably about 100 MPa or less, more preferably about 30 MPa or less, and the pressure is preferably in the range of about 0.1 to 100 MPa, about 0.1 to 70 MPa, about 5 to 100 MPa, about 5 to 70 MPa, about 10 to 100 MPa, or about 1 to 30 MPa. Examples of the method for constraining the all-solid-state battery 70 under high pressure from the outside include a method in which the all-solid-state battery is sandwiched between metal plates or the like, and fixed in a state of being pressed at high pressure (e.g. tightened with a vise or the like).

Examples of the method for constraining the all-solid-state battery 70 under high pressure from the outside include a method in which the all-solid-state battery is sandwiched between metal plates or the like, and fixed in a state of being pressed at high pressure (e.g. tightened with a vise or the like); and methods such as pressurization with gas.

From the same viewpoint, the temperature at which the all-solid-state battery 70 is constrained from the outside is preferably 20° C. or higher, more preferably 40° C. or higher, and preferably 200° C. or lower, more preferably 150° C. or lower, and is preferably in the range of about 20 to 150° C.

The shape of the all-solid-state battery 70 according to the present disclosure is not particularly limited, and is preferably a rectangular shape in plan view as shown in, for example, the schematic diagram of FIG. 3. Further, the ratio of the length of the first side of the all-solid-state battery 70 having a rectangular shape in plan view to the length of the second side in a direction perpendicular to the first side (length of first side: length of second side) is preferably about 1:1 to 1:5. If the length of the second side is excessively large relative to the first side, the R value (curvature radius) of a ridgeline (first curved section as described later) along the second side of a molded part M tends to be excessively large because the second side is difficult to fix to a mold at the time when the exterior material 10 is molded to form the later-described molded part M.

It is preferable that in the all-solid-state battery 70 according to the present disclosure, the battery element is housed in the molded part M having a rectangular shape in plan view, which is formed such that the exterior material 10 protrudes from the heat-sealable resin layer 4 side to the barrier layer 3 side as shown in the schematic diagrams of FIGS. 1 to 3. FIG. 1 is a diagram in which a molded part M is formed on one side of the all-solid-state battery 70. FIG. 2 is a diagram in which a molded part M is formed on both sides of the all-solid-state battery 70.

In the present disclosure, it is preferable that when viewed in a plan view from the barrier layer 3 side, the all-solid-state battery 70 includes a first curved section R1 (see R1$z$ in FIG. 2) and a second curved section R2 (see R2$z$ in FIG. 2) in this order from the center part toward the end part of the exterior material 10 is on a thickness-direction cross-section of the exterior material 10 on a straight line which is parallel to two sides parallel to each other (two sides parallel to the y direction or two sides parallel to the z direction in FIGS. 1 to 3) in the rectangular molded part M and which extends through the middle between the two parallel sides (see broken line Y in the y direction and broken line Z in the z direction in FIG. 3), and the R value (curvature radius) in the first curved section R1 is 1 mm or more. When the R value (curvature radius) is 1 mm or more, a force with which the exterior material 10 is stretched is not excessively large at a corner (corner part) of the rectangular molded part M, and thus generation of pinholes and the like in the barrier layer 3 before reaching a predetermined molding depth is suppressed. When the exterior material 10 is molded using a mold, the molded part M including the first curved section R1 and the second curved section R2 is formed such that the exterior material 10 protrudes from the heat-sealable resin layer 4 side to the barrier layer 3 side. In the molded part M, the first curved section R1 is located to protrude to the outside of the all-solid-state battery.

In the schematic view of FIG. 3, a sectional view on broken line Z corresponds to the schematic diagram of FIG. 2, and the molded part M includes the first curved section R1$z$ and the second curved section R2$z$ in this order from the center part to the end part of the exterior material 10. In the schematic view of FIG. 3, the molded part M includes the first curved section R1$y$ and the second curved section R2$y$ in this order from the center part to the end part of the exterior material 10 on the cross-section on broken line Y. The expression of first curved section R1$z$ means a first curved section in the z direction. Similarly, the expression of second curved section R2$z$ means a second curved section in the z direction, the expression of first curved section R1$y$ means a first curved section in the y direction, and the expression of second curved section R2$y$ means a second curved section in the y direction. For the first curved section R1$y$, the R value (curvature radius) is preferably 1 mm or more because when the R value (curvature radius) is 1 mm or more, a force with which the exterior material 10 is stretched is not excessively large at a corner (corner part) of the rectangular molded part M, and thus generation of pinholes and the like in the barrier layer 3 before reaching a predetermined molding depth is suppressed as in the case of the R value in the first curved section R1.

In the present disclosure, each of the R values (curvature radii) in each of the first curved section R1 and the second curved section R2 is a R value (curvature radius) on a surface of the exterior material 10 on the barrier layer 3 side (i.e. a portion which is on the outer surface side of the exterior material 10 and which is surrounded by, for example, the broken line in FIG. 2).

In the all-solid-state battery 70, it is preferable that the first side parallel to the y direction of the all-solid-state battery having a rectangular shape in plan view is a short side, the second side parallel to the z direction is a long side, and the R value (curvature radius) in the first curved section R1$z$ along the short side parallel to the y direction in which the terminal of the all-solid-state battery having a rectangular shape in plan view is installed is larger than the R value (curvature radius) in the first curved section R1$y$ along the long side parallel to the z direction, in, for example, FIG. 3, for the purpose of minimizing the dead space inside the battery and increasing the volume energy density.

3. Each Layer Forming Exterior Material for all-Solid-State Battery

The exterior material 10 according to the present disclosure includes a laminate including at least the base material layer 1, the barrier layer 3 and the heat-sealable resin layer 4 in this order from the outside, and the hydrogen sulfide permeability of the resin forming the heat-sealable resin layer 4 is $1.0 \times 10^{-9}$ cc·mm/cm$^2$·sec·cmHg or less. Hereinafter, each layer forming the exterior material 10 according to the present disclosure will be described in detail.

[Base Material Layer 1]

In the present disclosure, the base material layer 1 is a layer provided outside the barrier layer 3 (outer the barrier layer protective film 3$b$ when the barrier layer protective film 3$b$ is present) if necessary for the purpose of, for example, exhibiting a function as a base material of the exterior material 10. The base material layer 1 is located on the outer layer side of the exterior material 10.

The material that forms the base material layer 1 is not particularly limited as long as it has a function as a base material, i.e. at least insulation quality. The base material layer 1 can be formed using, for example, a resin, and the resin may contain additives described later.

When the base material layer 1 is formed of a resin, the base material layer 1 may be, for example, a resin film formed of a resin, or may be formed by applying a resin. The resin film may be an unstretched film or a stretched film. Examples of the stretched film include uniaxially stretched films and biaxially stretched films, and biaxially stretched films are preferable. Examples of the stretching method for forming a biaxially stretched film include a sequential biaxial stretching method, an inflation method, and a simultaneous biaxial stretching method. Examples of the method for applying a resin include a roll coating method, a gravure coating method and an extrusion coating method.

Examples of the resin that forms the base material layer 1 include resins such as polyester, polyamide, polyolefin, epoxy resin, acrylic resin, fluororesin, polyurethane, silicone resin and phenol resin, and modified products of these resins. The resin that forms the base material layer 1 may be a copolymer of these resins or a modified product of the copolymer. Further, a mixture of these resins may be used.

Of these resins, polyester and polyamide are preferable as resins that form the base material layer 1.

Specific examples of the polyester include polyethylene terephthalate, polybutylene terephthalate, polyethylene naphthalate, polybutylene naphthalate, polyethylene isophthalate and copolyester. Examples of the copolyester include copolyesters having ethylene terephthalate as a main repeating unit. Specific examples thereof include copolymer polyesters that are polymerized with ethylene isophthalate and include ethylene terephthalate as a main repeating unit (hereinafter, abbreviated as follows after polyethylene (terephthalate/isophthalate)), polyethylene (terephthalate/adipate), polyethylene (terephthalate/sodium sulfoisophthalate), polyethylene (terephthalate/sodium isophthalate), polyethylene (terephthalate/phenyl-dicarboxylate) and polyethylene (terephthalate/decane dicarboxylate). These polyesters may be used alone, or may be used in combination of two or more thereof.

Specific examples of the polyamide include polyamides such as aliphatic polyamides such as nylon 6, nylon 66, nylon 610, nylon 12, nylon 46, and copolymers of nylon 6 and nylon 66; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 616T (I denotes isophthalic acid and T denotes terephthalic acid), and polyamides containing aromatics, such as polyamide MXD6 (polymethaxylylene adipamide); cycloaliphatic polyamides such as polyamide PACM6 (polybis(4-aminocyclohexyl) methaneadipamide; polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof.

The base material layer 1 contains preferably at least one of a polyester film, a polyamide film and a polyolefin film, preferably at least one of a stretched polyester film, a stretched polyamide film and a stretched polyolefin film, still more preferably at least one of a stretched polyethylene terephthalate film, a stretched polybutylene terephthalate film, a stretched nylon film and a stretched polypropylene film, even more preferably at least one of a biaxially stretched polyethylene terephthalate film, a biaxially stretched polybutylene terephthalate film, a biaxially stretched nylon film, and a biaxially stretched polypropylene film.

The base material layer 1 may be a single layer, or may include two or more layers. When the base material layer 1 includes two or more layers, the base material layer 1 may be a laminate obtained by laminating resin films with an adhesive or the like, or a resin film laminate obtained by co-extruding resins to form two or more layers. The resin film laminate obtained by co-extruding resins to form two or more layers may be used as the base material layer 1 in an unstretched state, or may be uniaxially stretched or biaxially stretched and used as the base material layer 1. When the base material layer 1 is a single layer, it is preferable that the base material layer 1 is composed of a single layer of a polyester resin.

Specific examples of the resin film laminate with two or more layers in the base material layer 1 include laminates of a polyester film and a nylon film, nylon film laminates with two or more layers, and polyester film laminates with two or more layers. Laminates of a stretched nylon film and a stretched polyester film, stretched nylon film laminates with two or more layers, and stretched polyester film laminates with two or more layers are preferable. For example, when the base material layer 1 is a resin film laminate with two layers, the base material layer 1 is preferably a laminate of a polyester resin film and a polyester resin film, a laminate of a polyamide resin film and a polyamide resin film, or a laminate of a polyester resin film and a polyamide resin film, more preferably a laminate of a polyethylene terephthalate film and a polyethylene terephthalate film, a laminate of a nylon film and a nylon film, or a laminate of a polyethylene terephthalate film and a nylon film.

When the base material layer 1 is a resin film laminate with two or more layers, the two or more resin films may be laminated with an adhesive interposed therebetween. Specific examples of the preferred adhesive include the same adhesives as those exemplified for the adhesive agent layer 2 described later. The method for laminating a resin film having two or more layers is not particularly limited, and a known method can be employed. Examples thereof include a dry lamination method, a sand lamination method, an extrusion lamination method and a thermal lamination method, and a dry lamination method is preferable. When the resin film is laminated by a dry lamination method, it is preferable to use a polyurethane adhesive as the adhesive. Here, the thickness of the adhesive is, for example, about 2 to 5 μm. In addition, the lamination may be performed with an anchor coat layer formed on the resin film. Examples of the anchor coat layer include the same adhesives as those exemplified for the adhesive agent layer 2 described later. Here, the thickness of the anchor coat layer is, for example, about 0.01 to 1.0 μm.

Additives such as a slipping agent, a flame retardant, an antiblocking agent, an antioxidant, a light stabilizer, a tackifier and an antistatic agent may be present on at least one of the surface and inside of the base material layer 1. The additives may be used alone, or may be used in combination of two or more thereof.

In the present disclosure, it is preferable that a slipping agent is present on the surface of the base material layer 1 from the viewpoint of enhancing the moldability of the exterior material 10. The slipping agent is not particularly limited, and is preferably an amide-based slipping agent. Specific examples of the amide-based slipping agent include saturated fatty acid amides, unsaturated fatty acid amides, substituted amides, methylol amides, saturated fatty acid bisamides, unsaturated fatty acid bisamides, fatty acid ester amides an aromatic bisamides. Specific examples of the saturated fatty acid amide include lauric acid amide, palmitic acid amide, stearic acid amide, behenic acid amide, and hydroxystearic acid amide. Specific examples of unsaturated fatty acid amide include oleic acid amide and erucic acid amide. Specific examples of the substituted amide include N-oleylpalmitic acid amide, N-stearyl stearic acid amide, N-stearyl oleic acid amide, N-oleyl stearic acid amide and N-stearyl erucic acid amide. Specific examples of the methylolamide include methylolstearic acid amide. Specific examples of the saturated fatty acid bisamide include methylenebisstearic acid amide, ethylenebiscapric acid amide, ethylenebislauric acid amide, ethylenebisstearic acid amide, ethylenebishydroxystearic acid amide, ethylenebisbehenic acid amide, hexamethylenebisstearic acid amide, hexamethylenehydroxystearic acid amide, N,N'-distearyl adipic acid amide and N,N'-distearyl sebacic acid amide. Specific examples of the unsaturated fatty acid bisamide include ethylenebisoleic acid amide, ethylenebiserucic acid amide, hexamethylenebisoleic acid amide, N,N'-dioleyladipic acid amide and N,N'-dioleylsebacic acid amide. Specific examples of the fatty acid ester amide include stearoamideethyl stearate. Specific examples of the aromatic bisamide include m-xylylenebisstearic acid amide, m-xylylenebishydroxystearic acid amide and N,N'-distearylisophthalic acid amide. The slipping agents may be used alone, or may be used in combination of two or more thereof.

When the slipping agent is present on the surface of the base material layer 1, the amount of the slipping agent present is not particularly limited, and is preferably about 3 mg/m$^2$ or more, more preferably about 4 to 15 mg/m$^2$, still more preferably about 5 to 14 mg/m$^2$.

The slipping agent present on the surface of the base material layer 1 may be one obtained by exuding the slipping agent contained in the resin forming the base material layer 1, or one obtained by applying the slipping agent to the surface of the base material layer 1.

The thickness of the base material layer 1 is not particularly limited as long as a function as a base material is performed, and the thickness of the base material layer 1 is, for example, about 3 to 50 μm, preferably about 10 to 35 μm. When the base material layer 1 is a resin film laminate with two or more layers, the thickness of the resin film forming each layer is preferably about 2 to 25 μm.

[Adhesive Agent Layer 2]

In the exterior material 10, the adhesive agent layer 2 is a layer provided between the base material layer 1 and the barrier layer 3 if necessary for the purpose of improving bondability between these layers (bondability between the base material layer 1 and the barrier layer protective film 3b when the barrier layer protective film 3b is present).

The adhesive agent layer 2 is formed from an adhesive capable of bonding the base material layer 1 and the barrier layer 3 (or the barrier layer protective film 3b). The adhesive used for forming the adhesive agent layer 2 is not limited, and may be any of a chemical reaction type, a solvent volatilization type, a heat melting type, a heat pressing type, and the like. The adhesive agent may be a two-liquid curable adhesive (two-liquid adhesive), a one-liquid curable adhesive (one-liquid adhesive), or a resin that does not involve curing reaction. The adhesive agent layer 2 may be a single layer or a multi-layer.

Specific examples of the adhesive component contained in the adhesive include polyester such as polyethylene terephthalate, polybutylene terephthalate, polyethylene naphthalate, polybutylene naphthalate, polyethylene isophthalate and copolyester; polyether; polyurethane; epoxy resins; phenol resins; polyamides such as nylon 6, nylon 66, nylon 12 and copolymerized polyamide; polyolefin-based resins such as polyolefins, cyclic polyolefins, acid-modified polyolefins and acid-modified cyclic polyolefins; cellulose; (meth)acrylic resins; polyimide; polycarbonate; amino resins such as urea resins and melamine resins; rubbers such as chloroprene rubber, nitrile rubber and styrene-butadiene rubber; and silicone resins. These adhesive components may be used alone, or may be used in combination of two or more thereof. Of these adhesive components, polyurethane-based adhesives are preferable. In addition, the adhesive strength of these resins used as adhesive components can be increased by using an appropriate curing agent in combination. As the curing agent, appropriate one is selected from polyisocyanate, a polyfunctional epoxy resin, an oxazoline group-containing polymer, a polyamine resin, an acid anhydride and the like according to the functional group of the adhesive component.

Examples of the polyurethane adhesive include polyurethane adhesives containing a main agent containing a polyol compound and a curing agent containing an isocyanate compound. The polyurethane adhesive is preferably a two-liquid curable polyurethane adhesive having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound.

Other components may be added to the adhesive agent layer 2 as long as bondability is not inhibited, and the adhesive agent layer 2 may contain a colorant, a thermoplastic elastomer, a tackifier, a filler and the like. When the adhesive agent layer 2 contains a colorant, the exterior material 10 can be colored. As the colorant, known colorants such as pigments and dyes can be used. The colorants may be used alone, or may be used in combination of two or more thereof.

The type of pigment is not particularly limited as long as the bondability of the adhesive agent layer 2 is not impaired. Examples of the organic pigment include azo-based pigments, phthalocyanine-based pigments, quinacridone-based pigments, anthraquinone-based pigments, dioxazine-based pigments, indigothioindigo-based pigments, perinoneperylene-based pigments, isoindolenine-based pigments and benzimidazolone-based pigments. Examples of the inorganic pigment include carbon black-based pigments, titanium oxide-based pigments, cadmium-based pigments, lead-based pigments, chromium oxide-based pigments and iron-based pigments, and also fine powder of mica (mica) and fish scale foil.

Of the colorants, carbon black is preferable for the purpose of, for example, blackening the appearance of the exterior material 10.

The average particle diameter of the pigment is not particularly limited, and is, for example, about 0.05 to 5 μm, preferably about 0.08 to 2 μm. The mean particle size of the pigment is a median diameter measured by a laser diffraction/scattering particle size distribution measuring apparatus.

The content of the pigment in the adhesive agent layer 2 is not particularly limited as long as the exterior material 10 is colored, and the content is, for example, about 5 to 60 mass %, preferably 10 to 40 mass %.

The thickness of the adhesive agent layer 2 is not particularly limited as long as the base material layer 1 and the barrier layer 3 can be bonded to each other, and for example, the thickness is about 1 μm or more, or about 2 μm or more, and about 10 μm or less, or about 5 μm or less, and is preferably in the range of about 1 to 10 μm, about 1 to 5 μm, about 2 to 10 μm, or about 2 to 5 μm.

[Colored Layer]

The colored layer is a layer provided between the base material layer 1 and the barrier layer 3 (or the barrier layer protective film 3b) if necessary (not shown). When the adhesive agent layer 2 is present, the colored layer may be provided between the base material layer 1 and the adhesive agent layer 2 or between the adhesive agent layer 2 and the barrier layer 3 (or the barrier layer protective film 3b). The colored layer may be provided outside the base material layer 1. By providing the colored layer, the exterior material 10 can be colored.

The colored layer can be formed by, for example, applying an ink containing a colorant to the surface of the base material layer 1 or the surface of the barrier layer 3 (the surface of the barrier layer protective film 3b when the barrier layer protective film 3b is present). As the colorant, known colorants such as pigments and dyes can be used. The colorants may be used alone, or may be used in combination of two or more thereof.

Specific examples of the colorant contained in the colored layer include the same colorants as those exemplified in the section [Adhesive agent Layer 2].

[Barrier Layer 3]

In the exterior material 10, the barrier layer 3 is a layer which suppresses at least ingress of moisture.

Examples of the barrier layer 3 include metal foils, deposited films and resin layers having a barrier property. Examples of the deposited film include metal deposited films, inorganic oxide deposited films and carbon-containing inorganic oxide deposited films, and examples of the resin layer include those of polyvinylidene chloride, fluorine-containing resins such as polymers containing chlorotrifluoroethylene (CTFE) as a main component, polymers containing tetrafluoroethylene (TFE) as a main component, polymers having a fluoroalkyl group, and polymers containing a fluoroalkyl unit as a main component, and ethylene vinyl alcohol copolymers. Examples of the barrier layer 3 include resin films provided with at least one of these deposited films and resin layers. A plurality of barrier layers 3 may be provided. Preferably, the barrier layer 3 contains a layer formed of a metal material. Specific examples of the metal material forming the barrier layer 3 include aluminum alloys, stainless steel, titanium steel and steel sheets. When the metal material is used as a metal foil, it is preferable that the metal material includes at least one of an aluminum alloy foil and a stainless steel foil.

The aluminum alloy is more preferably a soft aluminum alloy foil formed of, for example, an annealed aluminum alloy from the viewpoint of improving the moldability of the exterior material 10, and is preferably an aluminum alloy foil containing iron from the viewpoint of further improving the moldability. In the aluminum alloy foil containing iron (100 mass %), the content of iron is preferably 0.1 to 9.0 mass %, more preferably 0.5 to 2.0 mass %. When the content of iron is 0.1 mass % or more, it is possible to obtain an exterior material having more excellent moldability. When the content of iron is 9.0 mass % or less, it is possible to obtain an exterior material further excellent in flexibility. Examples of the soft aluminum alloy foil include aluminum alloy foils having a composition specified in JIS H4160: 1994 A8021H-O, JIS H4160: 1994 A8079H-O, JIS H4000: 2014 A8021P-O, or JIS H4000: 2014 A8079P-O. If necessary, silicon, magnesium, copper, manganese or the like may be added. Softening can be performed by annealing or the like.

Examples of the stainless steel foil include austenitic stainless steel foils, ferritic stainless steel foils, austenitic/ferritic stainless steel foils, martensitic stainless steel foils and precipitation-hardened stainless steel foils. From the viewpoint of providing an exterior material 10 further excellent in moldability, it is preferable that the stainless steel foil is formed of austenitic stainless steel.

Specific examples of the austenite-based stainless steel foil include SUS 304 stainless steel, SUS 301 stainless steel and SUS 316L stainless steel, and of these, SUS 304 stainless steel is especially preferable.

When the barrier layer 3 is a metal foil, the barrier layer 3 may perform a function as a barrier layer suppressing at least ingress of moisture, and has a thickness of, for example, about 9 to 200 µm. For example, the thickness of the barrier layer 3 is preferably about 85 µm or less, more preferably about 50 µm or less, still more preferably about 40 µm or less, especially preferably about 35 µm or less, and preferably about 10 µm or more, more preferably about 20 µm or more, still more preferably about 25 µm or more. The thickness is preferably in the range of about 10 to 85 µm, about 10 to 50 µm, about 10 to 40 µm, about 10 to 35 µm, about 20 to 85 µm, about 20 to 50 µm, about 20 to 40 µm, about 20 to 35 µm, about 25 to 85 µm, about 25 to 50 µm, about 25 to 40 µm, or about 25 to 35 µm. When the barrier layer 3 is formed of an aluminum alloy foil, the thickness thereof is especially preferably in the above-described range, which is about 25 to 85 µm, especially preferably about 25 to 50 µm. Particularly, when the barrier layer 3 is formed of a stainless steel foil, the thickness of the stainless steel foil is preferably about 60 µm or less, more preferably about 50 µm or less, still more preferably about 40 µm or less, even more preferably about 30 µm or less, especially preferably about 25 µm or less, and preferably about 10 µm or more, more preferably about 15 µm or more. The thickness is preferably in the range of about 10 to 60 µm, about 10 to 50 µm, about 10 to 40 µm, about 10 to 30 µm, about 10 to 25 µm, about 15 to 60 µm, about 15 to 50 µm, about 15 to 40 µm, about 15 to 30 µm, or about 15 to 25 µm.

[Barrier Layer Protective Films 3a and 3b]

In the exterior material 10, it is preferable that the barrier layer protective film 3a is provided on the surface of the barrier layer 3 on the heat-sealable resin layer 4 side. In addition, it is also preferable that a barrier layer protective film 3b is provided on a surface of the barrier layer 3 on the base material layer 1 side. For example, the exterior material 10 may include the barrier layer protective film 3a only on a surface of the barrier layer 3 on the heat-sealable resin layer 4 side, or may include the barrier layer protective films 3a and 3b, respectively, on both surfaces of the barrier layer 3.

When the barrier layer protective film 3a in the exterior material 10 is analyzed by time-of-flight secondary ion mass spectrometry, the ratio of a peak intensity $P_{PO3}$ derived from $PO_3^-$ to a peak intensity $P_{CrPO4}$ derived from $CrPO_4$ ($P_{PO3/CrPO4}$) is preferably in the range of 6 to 120.

In the all-solid-state battery, it is desirable to continuously constrain the all-solid-state battery by high-pressure pressing from the outside of the exterior material even during use for suppressing delamination between the solid electrolyte and the negative active material layer or the positive active material layer. However, when the solid electrolyte, the negative active material layer or the positive active material layer are continuously constrained in a high-pressure state from the outside of the exterior material for the all-solid-state battery, there is a possibility that the heat-sealable resin layer of the exterior material is strongly pressed against the battery element, so that the thickness of the heat-sealable resin layer (inner layer) of the exterior material decreases, leading to contact between the barrier layer laminated on the exterior material and the solid electrolyte. In particular, there is a problem that if while the barrier layer of the exterior material is in contact with the solid electrolyte containing a sulfide solid electrolyte material, an electric current passes therebetween, an alloy is generated on the surface of the barrier layer, leading to deterioration of the barrier layer. In contrast, when the barrier layer protective film 3a in which the above-mentioned peak intensity ratio is within the above-described range is provided on the surface of the barrier layer 3 of the exterior material 10 in the all-solid-state battery 70 according to the present disclosure, the all-solid-state battery 70 is constrained in a high-pressure state, and thus even when a current passes between the barrier layer 3 and the solid electrolyte layer 40 while the solid electrolyte containing a sulfide solid electrolyte material extends through the heat-sealable resin layer 4 and the adhesive layer 5, an alloy is hardly generated on the surface of the barrier layer 3, so that deterioration of the barrier layer 3 is effectively suppressed.

In the present disclosure, the ratio of the peak intensity $P_{PO3}$ derived from $PO_3"$ to the peak intensity $P_{orPO4}$ derived from $CrPO_4"$ ($P_{PO3/CrPO4}$) is preferably in the range of 6 to 120, and from the viewpoint of more effectively suppressing deterioration of the barrier layer 3, the ratio $P_{PO3/CrPO4}$ is preferably about 10 or more in terms of lower limit, and preferably about 115 or less, more preferably about 110 or less, still more preferably about 50 or less in terms of upper limit. The ratio $P_{PO3/CrPO4}$ is preferably in the range of about 6 to 115, about 6 to 110, about 6 to 50, about 10 to 120, about 10 to 115, about 10 to 110 or about 10 to 50, more preferably about 10 to 50, especially preferably in the range of about 25 to 30.

In the present disclosure, when the barrier layer protective film 3a is analyzed by time-of-flight secondary ion mass spectrometry, the ratio of a peak intensity $P_{PO2}$ derived from $PO_2$ to a peak intensity $P_{orPO4}$ derived from $CrPO_4$ ($P_{PO2/CrPO4}$) is preferably in the range of 7 to 70.

The ratio of the peak intensity $P_{PO2}$ derived from $PO_2$ to the peak intensity $P_{CrPO4}$ derived from $CrPO_4"$ ($P_{PO2/CrPO4}$) is preferably in the range of 7 to 70, and from the viewpoint of more effectively suppressing deterioration of the barrier layer 3, the ratio $P_{PO2/CmPO4}$ is preferably about 10 or more in terms of lower limit, and preferably about 65 or less, more preferably about 50 or less in terms of upper limit. The ratio $P_{PO2/CrPO4}$ is preferably in the range of about 7 to 70, about 7 to 65, about 7 to 50, about 10 to 70, about 10 to 65 or about 10 to 50, more preferably about 10 to 50, especially preferably about 15 to 20.

In the present disclosure, when the barrier layer protective films 3a and 3b are provided on both surfaces of the barrier layer 3, the peak intensity ratio $P_{PO3/CrPO4}$ is preferably in the above range for both the barrier layer protective films 3a and 3b, and the peak intensity ratio $P_{PO2/CrPO4}$ is preferably in the above-described range.

Specifically, the method for analyzing the barrier layer protective films 3a and 3b by time-of-flight secondary ion mass spectrometry can be carried out under the following measurement conditions using a time-of-flight secondary ion mass spectrometer.

(Measurement Conditions)

Primary ion: double charge ion ($Bi_3^{++}$) of bismuth cluster
Primary ion accelerating voltage: 30 kV
Mass range (m/z): 0 to 1500
Measurement range: 100 μm×100 μm
Number of scans: 16 scan/cycle
Number of pixels (one side): 256 pixels
Etching ion: Ar gas cluster ion beam (Ar-GCIB)
Etching ion accelerating voltage: 5.0 kV Presence of chromium in the barrier layer protective film can be confirmed by X-ray photoelectron spectroscopy. Specifically, first, a layer laminated on the barrier layer (e.g. an adhesive agent layer, a heat-sealable resin layer or an adhesive layer) in the exterior material is physically delaminated. Next, the barrier layer is placed in an electric furnace at about 300° C. for about 30 minutes to remove organic components present on the surface of the barrier layer. Thereafter, the surface of the barrier layer is subjected to X-ray photoelectron spectroscopy to confirm that chromium is present.

The barrier layer protective films 3a and 3b can be formed by subjecting the surface of the barrier layer 3 to chemical conversion treatment with a treatment liquid containing a chromium compound such as chromium oxide.

Examples of the chemical conversion treatment using a treatment liquid containing a chromium compound include a method in which a chromium compound such as chromium oxide dispersed in phosphoric acid and/or a salt thereof is applied to the surface of the barrier layer 3 and baked to form a barrier layer protective film on the surface of the barrier layer 3.

The peak intensity ratio $P_{PO3/CrPO4}$ of the barrier layer protective films 3a and 3b and the peak intensity ratio $P_{PO2/CrPO4}$ can be adjusted by, for example, the composition of the treatment liquid for forming the barrier layer protective films 3a and 3b and the manufacturing conditions such as the temperature and time for baking treatment after the treatment.

The ratio of the chromium compound and phosphoric acid and/or a salt thereof in the treatment liquid containing the chromium compound is not particularly limited, and from the viewpoint of setting each of the peak intensity ratio $P_{PO3/CrPO4}$ and the peak intensity ratio $P_{PO2/CrPO4}$ within the above-described range, the ratio of phosphoric acid and/or a salt thereof to 100 parts by mass of the chromium compound is preferably about 30 to 120 parts by mass, more preferably about 40 to 110 parts by mass. As phosphoric acid and a salt thereof, for example, condensed phosphoric acid and a salt thereof can also be used.

The treatment liquid containing a chromium compound may further contain an anionic polymer and a crosslinking agent for crosslinking the anionic polymer. Examples of the anionic polymer include poly(meth)acrylic acid or salts thereof, and copolymers containing (meth)acrylic acid or a salt thereof as a main component. Examples of the crosslinking agent include compounds having any functional group selecting from an isocyanate group, a glycidyl group, a carboxyl group, and an oxazoline group and a silane coupling agent. There may be one anionic polymer and crosslinking agent, or two or more anionic polymers and crosslinking agents.

From the viewpoint of effectively suppressing deterioration of the barrier layer 3, it is preferable that the treatment liquid contains a chromium compound preferably contains an aminated phenol polymer. In the treatment liquid containing a chromium compound, the content of the aminated phenol polymer is preferably about 100 to 400 parts by mass, more preferably about 200 to 300 parts by mass based on 100 parts by mass of the chromium compound. The weight average molecular weight of the aminated phenol polymer is preferably about 5,000 to 20,000. The weight average molecular weight of the aminated phenol polymer is a value obtained by performing measurement by gel permeation chromatography (GPC) under the condition of using polystyrene as a standard sample.

The solvent of the treatment liquid containing a chromium compound is not particularly limited as long as it enables components present in the treatment liquid to be dispersed and evaporated by subsequent heating, and water is preferable. The solid content concentration of the treatment liquid containing a chromium compound is, for example, about 1 to 15 mass %. It is preferable that the surface temperature of the barrier layer when the treatment liquid is applied to the surface of the barrier layer and heated to form the barrier layer protective film is about 190 to 220° C., and the heating time is about 3 to 6 seconds. By adopting such a temperature and heating time, the solvent can be appropriately evaporated to suitably form the barrier layer protective film.

The solid content concentration of the chromium compound present in the treatment liquid for forming the barrier layer protective films 3a and 3b is not particularly limited, and is preferably about 7.0 to 12.0 mass %, more preferably about 8.0 to 11.0 mass %, still more preferably about 9.0 to 10.0 mass % from the viewpoint of setting each of the peak intensity ratio $P_{PO3/CrPO4}$ and the peak intensity ratio $P_{PO2/CrPO4}$ within the predetermined range to effectively suppress deterioration of the barrier layer The thickness of each of the barrier layer protective films 3a and 3b is not particularly limited, and is preferably about 1 nm to 10 μm, more preferably about 1 to 100 nm, still more preferably about 1 to 50 nm from the viewpoint of effectively suppressing deterioration of the barrier layer 3. The thickness of the barrier layer protective film can be measured by observation with a transmission electron microscope or a combination of observation with a transmission electron microscope and energy dispersive X-ray spectroscopy or electron beam energy loss spectroscopy.

From the same viewpoint, the amounts of the barrier layer protective films 3a and 3b per 1 m² of the surface of the barrier layer 3 are each preferably about 1 to 500 mg, more preferably about 1 to 100 mg, still more preferably about 1 to 50 mg.

Examples of the method for applying the treatment liquid containing a chromium compound to the surface of the barrier layer include a bar coating method, a roll coating method, a gravure coating method and an immersion method.

From the viewpoint of setting each of the peak intensity ratio $P_{PO3/CrPO4}$ and the peak intensity ratio $P_{PO2/CrPO4}$ within the predetermined range to effectively suppress the deterioration of the barrier layer 3, the heating temperature at the time of baking the treatment liquid to form the barrier layer protective film is preferably about 170 to 250° C., more preferably about 180 to 230° C. From the same viewpoint, the baking time is preferably about 2 to 10 seconds, more preferably about 3 to 6 seconds.

From the viewpoint of more efficiently performing the chemical conversion treatment of the surface of the barrier layer 3, it is preferable to perform degreasing treatment by a known treatment method such as an alkali immersion method, an electrolytic cleaning method, an acid cleaning method, an electrolytic acid cleaning method or an acid activation method before the barrier layer protective films 3a and 3b are provided on the surface of the barrier layer 3.

[Heat-Sealable Resin Layer 4]

In the exterior material 10 for an all-solid-state battery according to the present disclosure, the heat-sealable resin layer 4 is a layer (sealant layer) which corresponds to an innermost layer and performs a function of hermetically sealing the battery element with the heat-sealable resin layers 4 heat-sealed to each other during construction of the all-solid-state battery.

In the exterior material 10 for an all-solid-state battery according to the present disclosure, the hydrogen sulfide permeability of the resin forming the heat-sealable resin layer 4 is $1.0 \times 10^{-9}$ cc·mm/cm²·sec·cmHg or less. The hydrogen sulfide permeability of the resin forming the heat-sealable resin layer 4 can be specifically measured by the method described in examples.

The hydrogen sulfide permeability of the resin forming the heat-sealable resin layer 4 is preferably about $8.0 \times 10^{-10}$ cc·mm/cm²·sec·cmHg or less, more preferably about $5.0 \times 10^{-10}$ cc·mm/cm²·sec·cmHg or less. The lower limit of the hydrogen sulfide permeability is, for example, about $1.0 \times 10^{-10}$ cc·mm/cm²·sec·cmHg.

The water-vapor transmission rate of the heat-sealable resin layer 4 per 1 m² is preferably about 15.0 g/m²/24h or less, more preferably about 10.0 g/m²/24h or less, still more preferably about 8.0 g/m²/24h or less, even more preferably about 1.0 g/m²/24h or less. The lower limit of the total water-vapor permeability is, for example, about 5.0 g/m²/24h, about 1.0 g/m²/24h, about 0.1 g/m²/24h, or the like. The method for measuring the water-vapor transmission rate is as follows.

<Measurement of Water-Vapor Transmission Rate Per 1 m²>

The water-vapor transmission rate (g/m²/24h) per 1 m² (area of one surface) of the heat-sealable resin layer 4 is measured by the following method. The water-vapor transmission rate is measured using a water-vapor transmission rate measurement apparatus based on an isobaric pressure method under the measurement conditions of a temperature of 40° C., a relative humidity of 90%, a measurement period of 24 hours and a measurement area of 8 cmφ by using a method conforming to the provisions of ISO 15106-5 2008. The water-vapor transmission rate per 1 m² is a numerical value calculated in terms of m² in accordance with the water vapor transmission rate measurement method specified by ISO.

Examples of the resin having a hydrogen sulfide permeability of $1.0 \times 10^{-9}$ cc·mm/cm²·sec·cmHg or less include polyester, fluororesin, and cellophane, and polyester and fluororesin are preferable. Specific examples of the polyester include polyethylene terephthalate, polybutylene terephthalate, polyethylene naphthalate, polybutylene naphthalate, polyethylene isophthalate and copolyester, and polyethylene terephthalate is preferable. Examples of the preferred fluororesin include polytetrafluoroethylene (PTFE), tetrafluoroethylene-ethylene copolymer (ETFE) and polychlorotrifluoroethylene (PCTFE). As the resin forming the heat-sealable resin layer 4, polytetrafluoroethylene having a very small hydrogen sulfide permeability and water-vapor transmission rate is especially preferable.

The heat-sealable resin layer 4 may be formed from one resin alone, or may be formed from a blend polymer obtained by combining two or more resins. Further, the heat-sealable resin layer 4 may be formed of only one layer, or may be formed of two or more layers with the same resin or different resins.

The heat-sealable resin layer 4 may contain a slipping agent etc. if necessary. When the heat-sealable resin layer 4 contains a slipping agent, moldability of the exterior material 10 for an all-solid-state battery can be improved. The slipping agent is not particularly limited, and a known slipping agent can be used. The slipping agents may be used alone, or may be used in combination of two or more thereof.

The slipping agent is not particularly limited, and is preferably an amide-based slipping agent. Specific examples of the slipping agent include those exemplified for the base material layer 1. The slipping agents may be used alone, or may be used in combination of two or more thereof.

When a slipping agent is present on the surface of the heat-sealable resin layer 4, the amount of the slipping agent present is not particularly limited, and is preferably about 10 to 50 mg/m², more preferably about 15 to 40 mg/m² from the viewpoint of improving the moldability of the electronic packaging material.

The slipping agent present on the surface of the heat-sealable resin layer 4 may be one obtained by exuding the slipping agent contained in the resin forming the heat-sealable resin layer 4, or one obtained by applying a slipping agent to the surface of the heat-sealable resin layer 4.

The thickness of the heat-sealable resin layer 4 is not particularly limited as long as the heat-sealable resin layers are heat-sealed to each other to exhibit a function of sealing the battery element, and the thickness of the heat-sealable resin layer 4 is preferably 10 µm or more, more preferably 20 µm or more, still more preferably 30 µm or more from the viewpoint of effectively suppressing leakage of hydrogen sulfide to the outside. The thickness of the heat-sealable resin layer 4 is, for example, about 100 µm or less, preferably about 85 µm or less, more preferably about 60 µm or less, and preferably in the range of about 10 to 100 µm, about 10 to 85 µm, about 10 to 60 µm, about 20 to 100 µm, about 20 to 85 µm, about 20 to 60 µm, about 30 to 100 µm, about 30 to 85 µm, or about 30 to 60 µm.

[Adhesive Layer 5]

In the exterior material 10 for an all-solid-state battery according to the present disclosure, the adhesive layer 5 is a layer provided between the barrier layer 3 (or barrier layer protective film 3a) and the heat-sealable resin layer 4 if necessary for firmly bonding these layers to each other.

The adhesive layer 5 is formed from a resin capable of bonding the barrier layer 3 (or barrier layer protective film 3a) and the heat-sealable resin layer 4 to each other. The resin to be used for forming the adhesive layer 5 is, for example, the same as that of the adhesive exemplified for the adhesive agent layer 2.

The resin used for forming the adhesive layer 5 is preferably a resin containing a polyolefin backbone, such as a polyolefin or an acid-modified polyolefin. The resin forming the adhesive layer 5 can be confirmed to contain a polyolefin backbone by an analysis method such as infrared spectroscopy or gas chromatography mass spectrometry. In addition, it is preferable that a peak derived from maleic anhydride is detected when the resin forming the adhesive layer 5 is analyzed by infrared spectroscopy. For example, when a maleic anhydride-modified polyolefin is measured by infrared spectroscopy, peaks derived from maleic anhydride are detected near wave numbers of 1760 $cm^{-1}$ and 1780 $cm^{-1}$. When the adhesive layer 5 is a layer formed from a maleic anhydride-modified polyolefin, a peak derived from maleic anhydride is detected when measurement is performed by infrared spectroscopy. However, if the degree of acid modification is low, the peaks may be too small to be detected. In that case, the peaks can be analyzed by nuclear magnetic resonance spectroscopy.

Specific examples of the polyolefin include polyethylenes such as low-density polyethylene, medium-density polyethylene, high-density polyethylene and linear low-density polyethylene; ethylene-α-olefin copolymers; polypropylene such as homopolypropylene, block copolymers of polypropylene (e.g., block copolymers of propylene and ethylene) and random copolymers of polypropylene (e.g., random copolymers of propylene and ethylene); propylene-α-olefin copolymers; and terpolymers of ethylene-butene-propylene. Among them, polypropylene is preferable. The polyolefin resin in the case of a copolymer may be a block copolymer or a random copolymer. These polyolefin-based resins may be used alone, or may be used in combination of two or more thereof.

The polyolefin may be a cyclic polyolefin. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene; cyclic dienes such as cyclopentadiene, dicyclopentadiene, cyclohexadiene and norbornadiene. Among these polyolefins, cyclic alkenes are preferable, and norbornene is more preferable.

The acid-modified polyolefin is a polymer with the polyolefin modified by subjecting the polyolefin to block polymerization or graft polymerization with an acid component. As the polyolefin to be acid-modified, the above-mentioned polyolefins, copolymers obtained by copolymerizing polar molecules such as acrylic acid or methacrylic acid with the above-mentioned polyolefins, polymers such as crosslinked polyolefins, or the like can also be used. Examples of the acid component to be used for acid modification include carboxylic acids such as maleic acid, acrylic acid, itaconic acid, crotonic acid, maleic anhydride and itaconic anhydride, and anhydrides thereof.

The acid-modified polyolefin may be an acid-modified cyclic polyolefin. The acid-modified cyclic polyolefin is a polymer obtained by copolymerizing a part of monomers forming the cyclic polyolefin in place of an acid component, or block-polymerizing or graft-polymerizing an acid component with the cyclic polyolefin. The cyclic polyolefin to be modified with an acid is the same as described above. The acid component to be used for acid modification is the same as the acid component used for modification of the polyolefin.

Examples of preferred acid-modified polyolefins include polyolefins modified with a carboxylic acid or an anhydride thereof, polypropylene modified with a carboxylic acid or an anhydride thereof, maleic anhydride-modified polyolefins, and maleic anhydride-modified polypropylene.

From the viewpoint of firmly bonding the barrier layer 3 (or barrier layer protective film 3a) and the heat-sealable resin layer 4 to each other, it is preferable that the adhesive layer 5 contains an acid-modified polyolefin. As the acid-modified polyolefin, polyolefins modified with a carboxylic acid or an anhydride thereof, polypropylene modified with a carboxylic acid or an anhydride thereof, maleic anhydride-modified polyolefins, and maleic anhydride-modified polypropylene is especially preferable.

Further, from the viewpoint of obtaining the exterior material 10 for an all-solid-state battery excellent in shape stability after molding while decreasing the thickness of the exterior material 10 for an all-solid-state battery, the adhesive layer 5 is more preferably a cured product of a resin composition containing an acid-modified polyolefin and a curing agent. Preferred examples of the acid-modified polyolefin include those described above.

The adhesive layer 5 is preferably a cured product of a resin composition containing an acid-modified polyolefin and at least one selected from the group consisting of a compound having an isocyanate group, a compound having an oxazoline group, and a compound having an epoxy group, especially preferably a cured product of a resin composition containing an acid-modified polyolefin and at least one selected from the group consisting of a compound having an isocyanate group and a compound having an epoxy group. Preferably, the adhesive layer 5 preferably contains at least one selected from the group consisting of polyurethane, polyester and epoxy resin. More preferably, the adhesive layer 5 contains polyurethane and epoxy resin. As the polyester, for example, an amide ester resin is preferable. The amide ester resin is generally produced by reaction of a carboxyl group with an oxazoline group. The adhesive layer 5 is more preferably a cured product of a resin composition containing at least one of these resins and the acid-modified polyolefin. When an unreacted substance of a curing agent, such as a compound having an isocyanate group, a compound having an oxazoline group, or an epoxy resin remains in the adhesive layer 5, the presence of the unreacted substance can be confirmed by, for example, a method selected from infrared spectroscopy, Raman spectroscopy, time-of-flight secondary ion mass spectrometry (TOF-SIMS) and the like.

From the viewpoint of further improving adhesion between the barrier layer 3 and the adhesive layer 5, the adhesive layer 5 is preferably a cured product of a resin composition containing a curing agent having at least one selected from the group consisting of an oxygen atom, a heterocyclic ring, a C=N bond, and a C—O—C bond. Examples of the curing agent having a heterocyclic ring include curing agents having an oxazoline group, and curing agents having an epoxy group. Examples of the curing agent having a C=N bond include curing agents having an oxazoline group and curing agents having an isocyanate group. Examples of the curing agent having a C—O—C bond include curing agents having an oxazoline group, curing agents having an epoxy group, and polyurethane. Whether the adhesive layer 5 is a cured product of a resin composition containing any of these curing agents can be confirmed by, for example, a method such as gas chromatography-mass spectrometry (GCMS), infrared spectroscopy (IR), time-of-flight secondary ion mass spectrometry (TOF-SIMS), or X-ray photoelectron spectroscopy (XPS).

The compound having an isocyanate group is not particularly limited, and is preferably a polyfunctional isocyanate compound from the viewpoint of effectively improving adhesion between the barrier layer 3 (or barrier layer protective film 3a) and the adhesive layer 5. The polyfunctional isocyanate compound is not particularly limited as long as it is a compound having two or more isocyanate groups. Specific examples of the polyfunctional isocyanate-based curing agent include pentane diisocyanate (PDI), isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers. Examples thereof include adduct forms, biuret forms, and isocyanurate forms.

The content of the compound having an isocyanate group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 (or barrier layer protective film 3a) and the adhesive layer 5.

The compound having an oxazoline group is not particularly limited as long as it is a compound having an oxazoline backbone. Specific examples of the compound having an oxazoline group include compounds having a polystyrene main chain and compounds having an acrylic main chain. Examples of the commercially available product include EPOCROS series manufactured by Nippon Shokubai Co., Ltd.

The proportion of the compound having an oxazoline group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 (or barrier layer protective film 3a) and the adhesive layer 5.

Examples of the compound having an epoxy group include epoxy resins. The epoxy resin is not particularly limited as long as it is a resin capable of forming a crosslinked structure by epoxy groups existing in the molecule, and a known epoxy resin can be used. The weight average molecular weight of the epoxy resin is preferably about 50 to 2,000, more preferably about 100 to 1,000, still more preferably about 200 to 800. In the first present disclosure, the weight average molecular weight of the epoxy resin is a value obtained by performing measurement by gel permeation chromatography (GPC) under the condition of using polystyrene as a standard sample.

Specific examples of the epoxy resin include glycidyl ether derivatives of trimethylolpropane, bisphenol A diglycidyl ether, modified bisphenol A diglycidyl ether, novolak glycidyl ether, glycerin polyglycidyl ether and polyglycerin polyglycidyl ether. The epoxy resins may be used alone, or may be used in combination of two or more thereof.

The proportion of the epoxy resin in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 (or barrier layer protective film 3a) and the adhesive layer 5.

The polyurethane is not particularly limited, and a known polyurethane can be used. The adhesive layer 5 may be, for example, a cured product of two-liquid curable polyurethane.

The proportion of the polyurethane in the adhesive layer 5 is preferably in the range of 0.1 to 50 mass %, more preferably in the range of 0.5 to 40 mass % in the resin composition forming the adhesive layer 5.

When the adhesive layer 5 is a cured product of a resin composition containing at least one selected from the group consisting of a compound having an isocyanate group, a compound having an oxazoline group and an epoxy resin, and the acid-modified polyolefin, the acid-modified polyolefin functions as a main agent, and the compound having an isocyanate group, the compound having an oxazoline group, and the compound having an epoxy group each function as a curing agent.

The thickness of the adhesive layer 5 is preferably about 50 µm or less, about 40 µm or less, about 30 µm or less, about 20 µm or less, or about 5 µm or less, and preferably about 0.1 µm or more or about 0.5 µm or more. The thickness is preferably in the range of about 0.1 to 50 µm, about 0.1 to 40 µm, about 0.1 to 30 µm, about 0.1 to 20 µm, about 0.1 to 5 µm, about 0.5 to 50 µm, about 0.5 to 40 µm, about 0.5 to 30 µm, about 0.5 to 20 µm or about 0.5 to 5 µm. More specifically, the thickness is preferably about 1 to 10 µm, more preferably about 1 to 5 µm in the case of the adhesive exemplified for the adhesive agent layer 2 or a cured product of an acid-modified polyolefin with a curing agent. When a polyolefin or an acid-modified polyolefin is used, the thickness is preferably about 2 to 50 µm, more preferably about 10 to 40 µm. When the adhesive layer 5 is a cured product of a resin composition containing the adhesive exemplified for the adhesive agent layer 2 or an acid-modified polyolefin and a curing agent, the adhesive layer 5 can be formed by, for example, applying the resin composition and curing the resin composition by heating or the like. When a polyolefin or an acid-modified polyolefin is used, for example, extrusion molding can be performed.

[Surface Coating Layer]

The exterior material 10 according to the present disclosure may include a surface coating layer 6 on the base material layer 1 (on a side opposite to the barrier layer 3 from the base material layer 1) if necessary for the purpose of improving at least one of designability, scratch resistance, moldability and the like. The surface coating layer 6 is a layer located on the outermost layer side of the exterior material 10 when the all-solid-state battery is constructed using the exterior material 10.

The surface coating layer 6 can be formed from, for example, a resin such as polyvinylidene chloride, polyester, polyurethane, acrylic resin or epoxy resin.

When the resin forming the surface coating layer 6 is a curable resin, the resin may be any of a one-liquid curable type and a two-liquid curable type, and is preferably a two-liquid curable type. Examples of the two-liquid curable resin include two-liquid curable polyurethane, two-liquid curable polyester and two-liquid curable epoxy resins. Of these, two-liquid curable polyurethane is preferable.

Examples of the two-liquid curable polyurethane include polyurethane which contains a main agent containing a polyol compound and a curing agent containing an isocyanate compound. The polyurethane is preferably two-liquid curable polyurethane having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound.

If necessary, the surface coating layer 6 may contain additives such as the slipping agent, an anti-blocking agent, a matting agent, a flame retardant, an antioxidant, a tackifier and an anti-static agent on at least one of the surface and the inside of the surface coating layer 6 according to the functionality and the like to be imparted to the surface coating layer 6 and the surface thereof. The additives are in the form of, for example, fine particles having an average particle diameter of about 0.5 nm to 5 µm. The average particle diameter of the additives is a median diameter measured by a laser diffraction/scattering particle size distribution measuring apparatus.

The additives may be either inorganic substances or organic substances. The shape of the additive is not particularly limited, and examples thereof include a spherical shape, a fibrous shape, a plate shape, an amorphous shape and a scaly shape.

Specific examples of the additives include talc, silica, graphite, kaolin, montmorillonite, mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, acrylate resins, crosslinked acryl, crosslinked styrene, crosslinked polyethylene, benzoguanamine, gold, aluminum, copper and nickel. The additives may be used alone, or may be used in combination of two or more thereof. Of these additives, silica, barium sulfate and titanium oxide are preferable from the viewpoint of dispersion stability, costs and so on. The surface of the additive may be subjected to various kinds of surface treatments such as insulation treatment and dispersibility enhancing treatment.

The method for forming the surface coating layer 6 is not particularly limited, and examples thereof include a method in which a resin for forming the surface coating layer 6 is applied. When the additive is added to the surface coating layer 6, a resin mixed with the additive may be applied.

The thickness of the surface coating layer 6 is not particularly limited as long as the above-mentioned function as the surface coating layer 6 is performed, and it is, for example, about 0.5 to 10 µm, preferably about 1 to 5 µm.

The method for manufacturing exterior material 10 for an all-solid-state battery is not particularly limited as long as a laminate is obtained in which the layers of the exterior material 10 for an all-solid-state battery according to the present disclosure are laminated. Examples thereof include a method including the step of laminating at least the base material layer 1, the barrier layer 3 and the heat-sealable resin layer 4 in this order from the outside.

An example of the method for manufacturing the exterior material 10 for an all-solid-state battery according to the present disclosure is as follows. First, a laminate is formed in which the base material layer 1, the adhesive agent layer 2 and the barrier layer 3 (barrier layer protective film 3a if necessary) are laminated in this order (hereinafter, the laminate may be described as a "laminate A"). Specifically, the laminate A can be formed by a dry lamination method in which an adhesive to be used for formation of the adhesive agent layer 2 is applied onto the base material layer 1 or the barrier layer 3, the surface of which is subjected to a chemical conversion treatment if necessary, using a coating method such as a gravure coating method or a roll coating method, and dried, the barrier layer 3 or the base material layer 1 is then laminated, and the adhesive agent layer 2 is cured.

Then, the heat-sealable resin layer 4 is laminated on the barrier layer 3 of the laminate A. When the heat-sealable resin layer 4 is laminated directly on the barrier layer 3, a resin component that forms the heat-sealable resin layer 4 may be applied onto the barrier layer 3 of the laminate A by a method such as a gravure coating method or a roll coating method. When the adhesive layer 5 is provided between the barrier layer 3 and the heat-sealable resin layer 4, mention is made of, for example, (1) a method in which the adhesive layer 5 and the heat-sealable resin layer 4 are co-extruded to be laminated on the barrier layer 3 of the laminate A (co-extrusion lamination method); (2) a method in which the adhesive layer 5 and the heat-sealable resin layer 4 are laminated to form a laminate separately, and the laminate is laminated on the barrier layer 3 of the laminate A by a thermal lamination method; (3) a method in which an adhesive for formation of the adhesive layer 5 is laminated on the barrier layer 3 of the laminate A by an extrusion method or a method in which the adhesive is applied by solution coating, dried at a high temperature and baked, and the heat-sealable resin layer 4 formed in a sheet shape beforehand is laminated on the adhesive layer 5 by a thermal lamination method; and (4) a method in which the melted adhesive layer 5 is poured between the barrier layer 3 of the laminate A and the heat-sealable resin layer 4 formed in a sheet shape beforehand, and simultaneously the laminate A and the heat-sealable resin layer 4 are bonded together with the adhesive layer 5 interposed therebetween (sandwich lamination).

When a surface coating layer is provided, the surface coating layer is laminated on a surface of the base material layer 1 on a side opposite to the barrier layer 3. The surface coating layer can be formed by, for example, coating a surface of the base material layer 1 with the resin that forms the surface coating layer. The order of the step of laminating the barrier layer 3 on a surface of the base material layer 1 and the step of laminating the surface coating layer on a surface of the base material layer 1 is not particularly limited. For example, the surface coating layer may be formed on a surface of the base material layer 1, followed by forming the barrier layer 3 on a surface of the base material layer 1 on a side opposite to the surface coating layer.

A laminate including the surface coating layer provided if necessary, the base material layer 1, the adhesive agent layer 2 provided if necessary, the barrier layer 3 subjected to a chemical conversion treatment on a surface if necessary, the adhesive layer 5 provided if necessary, and the heat-sealable resin layer 4, in this order is formed in the manner described above, and the laminate may be further subjected to a heating treatment of a hot roll contact type, a hot air type, a near-infrared type, a far-infrared type or the like for enhancing the bondability of the adhesive agent layer 2 and the adhesive layer 5 provided if necessary. As conditions for such a heating treatment, for example, the temperature is about 150 to 250° C., and the time is about 1 to 5 minutes.

In the exterior material 10 for an all-solid-state battery, the layers that form the laminate may be subjected to a surface activation treatment such as a corona treatment, a blast treatment, an oxidation treatment or an ozone treatment if necessary for improving or stabilizing film formability, lamination processing and final product secondary processing (pouching and embossing molding) suitability, and the like. For example, by subjecting at least one surface of the base material layer 1 to a corona treatment, film formability, lamination processing and final product secondary processing suitability, and the like can be improved. Further, for example, by subjecting a surface of the base material layer 1, which is opposite to the barrier layer 3, to a corona treatment, the ink printability of the surface of the base material layer 1 can be improved.

EXAMPLES

Hereinafter, the present disclosure will be described in detail by way of examples and comparative examples. However, the present disclosure is not limited to examples.
<Hydrogen Sulfide Permeability of Resin Forming Heat-Sealable Resin Layer>

Figure 9:
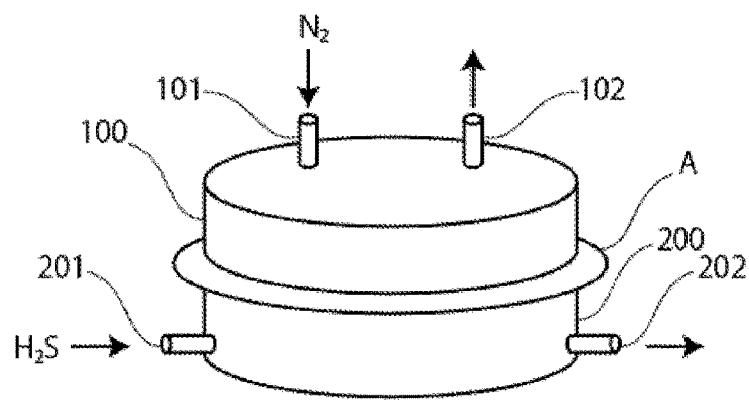
FIG. 9 is a schematic diagram for illustrating a method for measuring the hydrogen sulfide permeability of a resin forming a heat-sealable resin layer in Examples.

As shown in the schematic diagram of FIG. 9, the resin films (having thicknesses as shown in Table 1) used as heat-sealable resin layers of the exterior material for an all-solid-state battery were taken as samples, and the hydrogen sulfide permeability of the resin forming the heat-sealable resin layer was determined in accordance with the following procedure in an environment at a test temperature (about 23±5° C.). Table 1 shows the results.

(1) A sample A is placed between a separable flask upper part 100 and a separable flask lower part 200.
(2) Nitrogen gas at 50 ml/min is allowed to pass through a vent hole 101 of the separable flask upper part 100, and hydrogen sulfide gas at 50 ml/min ($H_2S$ concentration: 20±5 volume ppm/$N_2$) is allowed to pass through a vent hole 201 of the separable flask lower part 200.
(3) Under the following sampling conditions, a resin bag is connected to the vent hole 101 of the separable flask upper part 100, and 0.5 L of sample gas is collected for 10 minutes.
Sampling conditions: collecting 1 time in total after elapse of 48 hours
(4) The concentration of the sample gas collected in the resin bag is measured by a gas chromatograph-flame photometric detector (GC-FPD).
(5) From the sample gas concentration (volume ppb) obtained by the measurement, the permeability per hour (nL/hr) is calculated from the following calculation expression 1, and the permeability rate (cc/$m^2$ day) is calculated from the following calculation expression 2. The calculated value is converted to the unit of cc·mm/$cm^2$·sec·cmHg.

Calculation expression 1: permeability (nL/hr)=concentration (volume ppb*=nL/L)×amount of collected gas per hour (L/hr)

Since the test flow rate is 50 mL/min, the amount of collected gas per hour is 3L.

Calculation expression 2: permeability rate (cc/$m^2$ day)= permeability (nL/hr)×24 (hr)/106/effective test area ($m^2$)

As an effective test area, a separable flask opening area of 0.00465 $m^2$ is adopted.
<Water-Vapor Transmission Rate Per 1 $m^2$>

The water-vapor transmission rate (g/$m^{2/24}$h) per 1 $m^2$ (area of one surface) of each resin film used for measuring the hydrogen sulfide permeability was measured by the following method. The water-vapor transmission rate was measured using a water-vapor transmission rate measurement apparatus (apparatus name: PERMATRAN manufactured by MOCON, Inc.) based on an isobaric pressure method under the measurement conditions of a temperature of 40° C., a relative humidity of 90%, a measurement period of 24 hours and a measurement area of 8 cmφ by using a method conforming to ISO 15106-5 2008. The water-vapor transmission rate per 1 $m^2$ is a numerical value calculated in terms of $m^2$ in accordance with the water vapor transmission rate measurement method specified by ISO. Table 1 shows the results.
<Evaluation of Leakage of Hydrogen Sulfide in the Case of Exterior Material>

Peripheral portions (four sides) of two exterior materials (having a rectangular shape in plan view with a length of 3.00 mm and a width of 1.50 mm) including a laminate in which a base material layer (30 μm), an adhesive agent layer (3 μm), a barrier layer (40 μm) and a heat-sealable resin layer (the thickness of a resin film is shown in Table 1) are laminated in this order were heat-sealed at a width of 3 mm (the thickness of each heat-sealable resin layer decreases to 95% in the heat-sealed portion), and assuming that the exterior materials would be used for an all-solid-state battery, a leakage of hydrogen sulfide from the heat-sealable resin layer (hydrogen sulfide permeability (cc)) for 10 years was calculated using the value of hydrogen sulfide permeability obtained in <Hydrogen sulfide permeability of resin forming heat-sealable resin layer> described above. Such calculation was performed on the premise that the barrier layer has a hydrogen sulfide permeability of 0 cc and hydrogen sulfide passes from the heat-sealed portion of the heat-sealable resin layer. Table 1 shows the results.

TABLE 1

| Resin film | | Water-vapor transmission rate per 1 $m^2$ (g/$m^2$/24 h) | Hydrogen sulfide permeability (cc · mm/ $cm^2$ · cmHg) | Leakage of hydrogen sulfide in the case of exterior material (permeability for 10 years) (cc) |
|---|---|---|---|---|
| Resin | Thickness (μm) | | | |
| Polytetrafluoroethylene | 50 | 0.704 | <4.72 × $10^{-10}$ | 8.3 × $10^{-5}$ |
| Polyethylene terephthalate | 50 | 12.871 | <7.66 × $10^{-10}$ | 1.0 × $10^{-4}$ |
| Polycarbonate | 40 | Not below detection limit | 1.18 × $10^{-9}$ | 1.2 × $10^{-4}$ |

TABLE 1-continued

| Resin film | | Water-vapor transmission rate per 1 m² (g/m²/24 h) | Hydrogen sulfide permeability (cc · mm/ cm² · cmHg) | Leakage of hydrogen sulfide in the case of exterior material (permeability for 10 years) (cc) |
|---|---|---|---|---|
| Resin | Thickness (μm) | | | |
| Polyethylene | 40 | 7.240 | $1.56 \times 10^{-8}$ | $1.7 \times 10^{-3}$ |
| Polypropylene | 35 | 6.567 | $1.27 \times 10^{-8}$ | $1.1 \times 10^{-3}$ |

Example 1

As a base material layer, a laminated film was prepared in which a polyethylene terephthalate film (12 μm), an adhesive agent layer (two-liquid curable urethane adhesive (polyol compound and aromatic isocyanate compound), thickness: 3 μm) and a biaxially stretched nylon film (thickness: 15 μm) were laminated in this order. In addition, an aluminum alloy foil (JIS H4160: 1994 A 8021 H-O, thickness: 40 μm) was prepared as a barrier layer. Both surfaces of the barrier layer were subjected to chemical conversion treatment by a method as described later to form a barrier layer protective film (thickness: 10 nm). Next, the barrier layer and the base material layer were laminated by a dry lamination method. Specifically, an adhesive agent layer (thickness after curing: 3 μm) was formed by applying a two-liquid curable urethane adhesive (polyol compound and aromatic isocyanate compound) was applied to one surface of the barrier layer protective film formed on the surface of the barrier layer. The adhesive agent layer and the biaxially stretched nylon film were then laminated, and aging treatment was then performed to prepare a laminate of base material layer/adhesive agent layer/barrier layer protective film/barrier layer/barrier layer protective film. Next, on the barrier layer protective film of the obtained laminate, a two-liquid curable urethane adhesive (polyol compound and aromatic isocyanate compound) as an adhesive layer, thickness after curing: 3 μm) and a polytetrafluoroethylene film (thickness: 50 μm) in Table 1 as a heat-sealable resin layer were laminated to form a laminate of adhesive layer/heat-sealable resin layer. Next, the obtained laminate was aged and heated to obtain an exterior material including a laminate in which a base material layer (polyethylene terephthalate film (12 μm)), an adhesive agent layer (3 μm), a biaxially oriented nylon film (15 μm), an adhesive agent layer (3 μm), a barrier layer protective film (10 nm), a barrier layer (40 μm), a barrier layer protective film (10 nm), an adhesive layer (3 μm) and a heat-sealable resin layer (50 μm) were laminated in this order.

The barrier layer protective film was formed on both surfaces of the barrier layer as follows. A treatment liquid containing 43 parts by mass of an aminated phenol polymer, 16 parts by mass of chromium fluoride and 13 parts by mass of phosphoric acid based on 100 parts by mass of water was prepared, and the treatment liquid was applied to both surfaces of the barrier layer (film thickness after drying is 10 nm), and heated and dried for about 3 to 6 seconds at a temperature of about 190 to 230° C. in terms of the surface temperature of the barrier layer.

Example 2

Except that a polyethylene terephthalate film (thickness: 50 μm) in Table 1 was used as the heat-sealable resin layer, the same procedure as in Example 1 was carried out to obtain an exterior material including a laminate in which a base material layer (Polyethylene terephthalate film (12 μm)/adhesive layer (3 μm)/biaxially stretched nylon film (15 μm)), an adhesive agent layer (3 μm), a barrier layer protective film (10 nm), a barrier layer (40 μm), a barrier layer protective film (10 nm), an adhesive layer (3 μm) and a heat-sealable resin layer (40 μm) were laminated in this order.

Example 3

Except that a barrier layer protective film was not formed on a surface of the barrier layer, the same procedure as in Example 1 was carried out to obtain an exterior material including a laminate in which a base material layer (polyethylene terephthalate film (12 μm)), an adhesive agent layer (3 μm), a biaxially stretched nylon film (15 μm), an adhesive agent layer (3 μm), a barrier layer (40 μm), an adhesive layer (3 μm) and a heat-sealable resin layer (50 μm) were laminated in this order.

Example 4

Except that a barrier layer protective film was not formed on a surface of the barrier layer, the same procedure as in Example 2 was carried out to obtain an exterior material including a laminate in which a base material layer (polyethylene terephthalate film (12 μm)), an adhesive agent layer (3 μm), a biaxially oriented nylon film (15 μm), an adhesive agent layer (3 μm), a barrier layer (40 μm), an adhesive layer (3 μm) and a heat-sealable resin layer (50 μm) were laminated in this order.

<Time-of-Flight Secondary Ion Mass Spectrometry>

The barrier layer protective film was analyzed as follows. First, the barrier layer and the adhesive layer were peeled off from each other. Here, the film was physically delaminated without using water, an organic solvent, an aqueous solution of an acid or an alkali, or the like. After delamination between the barrier layer and the adhesive layer, the adhesive layer remained on the surface of the barrier layer, and the remaining adhesive layer was removed by etching with Ar-GCIB. For the surface of the barrier layer thus obtained, the barrier layer protective film was analyzed by time-of-flight secondary ion mass spectrometry. Table 1 shows the peak intensities $P_{CrPO4}$, $P_{PO2}$ and $P_{PO3}$ derived from $CrPO_4^-$, $PO_2^-$ and $PO_3^-$, the ratio of the peak intensity $P_{PO2}$ to the peak intensity $P_{CrPO4}$ ($P_{PO2/CrPO4}$) and the ratio of the peak intensity $P_{PO3}$ to the peak intensity $P_{CrPO4}$ ($P_{PO3/CrPO4}$). In Examples 3 and 4, a barrier layer protective film was not formed on the surface of the barrier layer, and therefore in Table 1, items on the peak intensity $P_{CrPO4}$ of $CrPO_4$ are indicated by "-".

Details of the measuring apparatus and measurement conditions for time-of-flight secondary ion mass spectrometry are as follows. Measuring apparatus: time-of-flight secondary ion mass spectrometer TOF.SIMS5 manufactured by ION-TOF Corporation (Measurement Conditions)

Primary ion: double charge ion ($B_{13}^{++}$) of bismuth cluster
Primary ion accelerating voltage: 30 kV
Mass range (m/z): 0 to 1500
Measurement range: 100 μm×100 μm
Number of scans: 16 scan/cycle
Number of pixels (one side): 256 pixels
Etching ion: Ar gas cluster ion beam (Ar-GCIB)
Etching ion accelerating voltage: 5.0 kV <Evaluation on Deterioration of Barrier Layer by Constraint in High-Pressure Pressing>

A hole of φ 1 mm was made on the heat-sealable resin layer side of the exterior material so as to expose the surface of the barrier layer protective film. Specifically, in Example 1 to 4 above, a heat-sealable resin layer having holes of φ 1 mm so as to expose the surface of the barrier layer protective film was used to prepare an exterior material. Each of these exterior materials was used as a test piece, and high-pressure pressing (50 MPa) was applied with a sulfide solid electrolyte ($Li_2S:P_2S_5=75:25$, thickness 300 μm) disposed between the test piece and a lithium indium alloy (LiIn alloy). Here, the sulfide solid electrolyte was disposed so as to be located at a position in the exterior material where a hole of φ 1 mm was formed. In Examples 3 and 4, the barrier layer protective film was not provided, and therefore the surface of the barrier layer was exposed. In this state, a voltage of 0.53V was applied between the barrier layer of the test piece and the LiIn alloy, and the test piece was left to stand for 1 hour. After a lapse of 1 hour, a surface of the barrier layer at a position in the test piece where the hole of φ1 mm was formed was observed with a microscope to determine whether or not an alloy was formed on the surface of the barrier layer. A test piece having no alloy formed on the surface of the barrier layer was rated as A, and a test piece having an alloy formed on the surface of the barrier layer was rated as C. Table 2 shows the results.

TABLE 2

| | Time-of-flight secondary ion mass spectrometry of barrier protective layer | | | | | Evaluation on deterioration of barrier layer by constraint in high-pressure pressing |
|---|---|---|---|---|---|---|
| | Peak intensity | | | Peak intensity ratio | | |
| | $P_{PO2}$ | $P_{PO3}$ | $P_{CrPO4}$ | $P_{PO2}/P_{CrPO4}$ | $P_{PO3}/P_{CrPO4}$ | |
| Example 1 | $6.3 \times 10^5$ | $1.0 \times 10^6$ | $3.8 \times 10^4$ | 16.6 | 26.8 | A |
| Example 2 | $6.3 \times 10^5$ | $1.0 \times 10^6$ | $3.8 \times 10^4$ | 16.6 | 26.8 | A |
| Example 3 | — | — | — | — | — | C |
| Example 4 | — | — | — | — | — | C |

As described above, the present disclosure provides an invention of an aspect as described below.

Item 1. An exterior material for an all-solid-state battery which is used for an all-solid-state battery containing a sulfide solid electrolyte material, and includes a laminate including at least a base material layer; a barrier layer; and a heat-sealable resin layer in this order from the outside, wherein the hydrogen sulfide permeability of a resin forming the heat-sealable resin layer is $1.0 \times 10^{-9}$ cc·mm/cm$^2$·sec·cmHg or less.

Item 2. The exterior material for an all-solid-state battery according to item 1, wherein the heat-sealable resin layer has a thickness of 10 μm or more.

Item 3. The exterior material for an all-solid-state battery according to item 1 or 2, wherein the base material layer includes a polyester, an adhesive agent layer and a polyamide in this order from the outside.

Item 4. The exterior material for an all-solid-state battery according to item 1 or 2, wherein the base material layer includes a single layer of a polyester resin.

Item 5. The exterior material for an all-solid-state battery according to any one of items 1 to 4, wherein the resin forming the heat-sealable resin layer is polyester or fluororesin.

Item 6. The exterior material for an all-solid-state battery according to any one of items 1 to 5, wherein the laminate has a barrier layer protective film formed on a surface of the barrier layer, and
when the barrier layer protective film is analyzed by time-of-flight secondary ion mass spectrometry, the ratio of a peak intensity $P_{PO3}$ derived from $PO_3$ to a peak intensity $P_{CrPO4}$ derived from $CrPO_4^-$ ($P_{PO3/CrPO4}$) is in the range of 6 or more and 120 or less.

Item 7. An all-solid-state battery packaging obtained by molding the exterior material for an all-solid-state battery according to any one of items 1 to 6.

Item 8. An all-solid-state battery in which a battery element including at least a unit cell including a positive active material layer, a negative active material layer, and a solid electrolyte layer laminated between the positive active material layer and the negative active material layer is housed in a packaging formed from an exterior material for an all-solid-state battery, wherein
the solid electrolyte layer contains a sulfide solid electrolyte material,
the exterior material for an all-solid-state battery includes a laminate including at least a base material layer, a barrier layer and a heat-sealable resin layer in this order from the outside, and
the hydrogen sulfide permeability of a resin forming the heat-sealable resin layer is $1.0 \times 10^{-9}$ cc·mm/cm$^2$·sec·cmHg or less.

Item 9. A method for manufacturing an exterior material for an all-solid-state battery which is used for an all-solid-state battery containing a sulfide solid electrolyte material, the method including the step of laminating at least a base material layer; a barrier layer; and a heat-sealable resin layer in this order from the outside to obtain a laminate, wherein the hydrogen sulfide permeability of a resin forming the heat-sealable resin layer is $1.0 \times 10^{-9}$ cc·mm/cm$^2$·sec·cmHg or less.

DESCRIPTION OF REFERENCE SIGNS

1: Base material layer
2: Adhesive agent layer
3: Barrier layer
3a, 3b: Barrier layer protective film
4: Heat-sealable resin layer
5: Adhesive layer
10: Exterior material for all-solid-state battery
20: Negative electrode layer
21: Negative active material layer
22: Negative electrode current collector
30: Positive electrode layer
31: Positive active material layer
32: Positive electrode current collector
40: Solid electrolyte layer
50: Unit cell
60: Terminal
70: All-solid-state battery

The invention claimed is:
1. An exterior material for an all-solid-state battery is used for an all-solid-state battery including a sulfide solid electrolyte material, the exterior material comprising a laminate including: at least a base material layer; a barrier layer; and a heat-sealable resin layer in this order from the outside, wherein an amount of hydrogen sulfide permeation through a resin forming the heat-sealable resin layer is $1.0 \times 10^{-9}$ cc·mm/cm²·sec·cmHg or less to suppress leaking hydrogen sulfide generated from the all-solid state battery.

2. The exterior material for an all-solid-state battery according to claim 1, wherein the heat-sealable resin layer has a thickness of 10 μm or more.

3. The exterior material for an all-solid-state battery according to claim 1, wherein the base material layer includes a polyester, an adhesive agent layer and a polyamide in this order from the outside.

4. The exterior material for an all-solid-state battery according to claim 1, wherein the base material layer includes a single layer of a polyester resin.

5. The exterior material for an all-solid-state battery according to claim 1, wherein the resin forming the heat-sealable resin layer is polyester or fluororesin.

6. The exterior material for an all-solid-state battery according to claim 1, wherein the laminate has a barrier layer protective film formed on a surface of the barrier layer, and
when the barrier layer protective film is analyzed by time-of-flight secondary ion mass spectrometry, the ratio of a peak intensity $P_{PO3}$ derived from $PO_3$ to a peak intensity $P_{CrPO4}$ derived from $CrPO_4$ ($P_{PO3/CFP04}$) is in the range of 6 or more and 120 or less.

7. An all-solid-state battery packaging obtained by molding the exterior material for an all-solid-state battery according to claim 1.

8. The exterior material for an all-solid-state battery according to claim 1, wherein the amount of hydrogen sulfide permeation through the resin forming the heat-sealable resin layer is $8.0 \times 10^{-10}$ cc·mm/cm²·sec·cmHg or less.

9. The exterior material for an all-solid-state battery according to claim 1, wherein the amount of hydrogen sulfide permeation through the resin forming the heat-sealable resin layer is $5.0 \times 10^{-10}$ cc·mm/cm²·sec·cmHg or less.

10. The exterior material for an all-solid-state battery according to claim 1, wherein the resin forming the heat-sealable resin layer is selected from the group consisting of polyesters, fluororesins, cellophane, and combinations thereof.

11. An all-solid-state battery in which a battery element including at least a unit cell including a positive active material layer, a negative active material layer, and a solid electrolyte layer laminated between the positive active material layer and the negative active material layer is housed in a packaging formed from an exterior material for an all-solid-state battery, wherein
the solid electrolyte layer contains a sulfide solid electrolyte material,
the exterior material for an all-solid-state battery includes a laminate including at least a base material layer, a barrier layer and a heat-sealable resin layer in this order from the outside, and
a hydrogen sulfide permeability of a resin forming the heat-sealable resin layer is $1.0 \times 10^{-9}$ cc·mm/cm² sec·cmHg or less to suppress leaking hydrogen sulfide generated from the all-solid state battery.

12. The all-solid-state battery according to claim 11, wherein the amount of hydrogen sulfide permeation through the resin forming the heat-sealable resin layer is $8.0 \times 10^{-10}$ cc·mm/cm²·sec·cmHg or less.

13. The all-solid-state battery according to claim 8, wherein the amount of hydrogen sulfide permeation through the resin forming the heat-sealable resin layer is $5.0 \times 10^{-10}$ cc·mm/cm²·sec·cmHg or less.

14. The all-solid-state battery according to claim 11, wherein the resin forming the heat-sealable resin layer is selected from the group consisting of polyesters, fluororesins, cellophane, and combinations thereof.

15. A method for manufacturing an exterior material for an all-solid-state battery which is used for an all-solid-state battery containing a sulfide solid electrolyte material, the method comprising the step of laminating at least a base material layer; a barrier layer; and a heat-sealable resin layer in this order from the outside to obtain a laminate,
wherein a hydrogen sulfide permeability of a resin forming the heat-sealable resin layer is $1.0 \times 10^{-9}$ cc·mm/cm²·sec·cmHg or less to suppress leaking hydrogen sulfide generated from the all-solid state battery.

16. The method according to claim 15, wherein the amount of hydrogen sulfide permeation through the resin forming the heat-sealable resin layer is $8.0 \times 10^{-10}$ cc·mm/cm²·sec·cmHg or less.

17. The method according to claim 15, wherein the amount of hydrogen sulfide permeation through the resin forming the heat-sealable resin layer is $5.0 \times 10^{-10}$ cc·mm/cm²·sec·cmHg or less.

18. The method according to claim 15, wherein the resin forming the heat-sealable resin layer is selected from the group consisting of polyesters, fluororesins, cellophane, and combinations thereof.

* * * * *